United States Patent
Wu et al.

(10) Patent No.: US 9,588,370 B2
(45) Date of Patent: Mar. 7, 2017

(54) DISPLAY DEVICE

(75) Inventors: Ting-I Wu, Tainan (TW); Wang-Yang Li, Tainan (TW)

(73) Assignee: CHI MEI MATERIALS TECHNOLOGY CORPORATION, Tainan (TW)

(*) Notice: Subject to any disclaimer, the term of this patent is extended or adjusted under 35 U.S.C. 154(b) by 519 days.

(21) Appl. No.: 13/197,073

(22) Filed: Aug. 3, 2011

(65) Prior Publication Data

US 2012/0033153 A1 Feb. 9, 2012

(30) Foreign Application Priority Data

Aug. 5, 2010 (TW) ................................ 99126112 A

(51) Int. Cl.
*G02F 1/1335* (2006.01)

(52) U.S. Cl.
CPC ................... *G02F 1/133504* (2013.01); *G02F 2001/133562* (2013.01); *G02F 2201/305* (2013.01)

(58) Field of Classification Search
CPC ............ G02B 27/4261; G02B 27/4205; G02F 1/1323; G02F 1/1396; G02F 1/1397; G02F 1/292; G02F 1/133504; G02F 2001/133562; G02F 2201/305
USPC ........................................................ 349/179
See application file for complete search history.

(56) References Cited

U.S. PATENT DOCUMENTS

| | | | |
|---|---|---|---|
| 5,654,810 A | 8/1997 | Okamura et al. | |
| 6,067,137 A * | 5/2000 | Ohnishi et al. | 349/112 |
| 6,483,612 B2 | 11/2002 | Walker | |
| 7,405,787 B2 | 7/2008 | Paukshto et al. | |
| 2003/0107691 A1* | 6/2003 | Kaneko et al. | 349/113 |
| 2003/0122487 A1 | 7/2003 | Kwon | |
| 2004/0189910 A1* | 9/2004 | Paukshto et al. | 349/123 |
| 2004/0246416 A1* | 12/2004 | Maeda | G02F 1/133371 349/114 |
| 2006/0256263 A1* | 11/2006 | Shimizu et al. | 349/113 |
| 2007/0139582 A1* | 6/2007 | Numata et al. | 349/61 |

(Continued)

FOREIGN PATENT DOCUMENTS

| | | |
|---|---|---|
| CN | 1425945 | 6/2003 |
| CN | 101329463 A | 12/2008 |

(Continued)

OTHER PUBLICATIONS

English translation of abstract of JP 2005-070632.

(Continued)

*Primary Examiner* — Jessica M Merlin
(74) *Attorney, Agent, or Firm* — McClure, Qualey & Rodack, LLP

(57) ABSTRACT

A display device is disclosed. The display device includes a display and a diffractive optical element (DOE). The display is used to show an image. When a user looks at the image within a first viewing angle range, he can see a first observed image, and when he looks at the image within a second viewing angle range, he can see a second observed image. The diffractive optical element is disposed in the lighting direction of the display to diffract the light constructing the first observed image to the second viewing angle range, thereby converting the first observed image into a third observed image and converting the second observed image into a fourth observed image at the same time.

18 Claims, 20 Drawing Sheets

(56) References Cited

U.S. PATENT DOCUMENTS

| | | | |
|---|---|---|---|
| 2009/0040425 A1* | 2/2009 | Chang | 349/64 |
| 2009/0040607 A1 | 2/2009 | Amako et al. | |
| 2009/0135487 A1* | 5/2009 | Ohmori et al. | 359/569 |
| 2009/0225244 A1 | 9/2009 | Wang et al. | |
| 2010/0134733 A1* | 6/2010 | Watanabe et al. | 349/112 |
| 2010/0277803 A1* | 11/2010 | Pockett | G02B 27/4277 359/567 |

FOREIGN PATENT DOCUMENTS

| | | |
|---|---|---|
| CN | 101526674 A | 9/2009 |
| EP | 0567995 | 11/1993 |
| JP | 7104276 A | 4/1995 |
| JP | 200089216 A | 3/2000 |
| JP | 2005-070632 | 3/2005 |
| TW | 457390 | 10/2001 |
| TW | 469359 | 12/2001 |

OTHER PUBLICATIONS

English translation of abstract of TW 457390 (published Oct. 1, 2001).

English translation of abstract of CN 1425945 (published Jun. 25, 2003).

* cited by examiner

DISPLAY DEVICE

RELATED APPLICATIONS

This application claims priority to Taiwan Application Serial Number 099126112, filed Aug. 5, 2010, which is herein incorporated by reference

BACKGROUND

Field of Invention

The present invention relates to a display device with a wide viewing angle. More particularly, the present invention relates to a wide viewing angle display device utilizing light diffraction to improve a viewing angle of a display device.

Description of Related Art

With the advance of the fabrication technology of thin film transistors, liquid crystal display (LCD) devices are generally applied into variable electronic products such as televisions, personal digital assistants, notebooks, digital cameras, video cameras and recorders, and mobile phones, etc, because the LCD devices has advantages of brightness, thinness, low power consumption, and no harmful radiations, etc. However, since the LCD device is not a self-luminous display, a backlight source is required to generate light for the LCD device, and the light is guided to pass through optical films such as diffusion layers and brightness enhancement films (BEF), thereby forming a uniform planar light emitted into a liquid crystal display panel to enable the LCD device to show images. Twisted nematic (TN) or super twisted nematic LCD devices are popular displays of common displays. The TN and STN liquid crystal display devices have an advantage of competitive price, but a visual angle thereof is smaller than that of wide visual angle LCDs (for example, multiple-domain vertical alignment (MVA) displays, in-plane switching (IPS) displays, and fringe field switching (FFS) displays, etc).

The visual angle means an angle range in which the display can show images with good quality. For example, with respect to a desktop display, users often look at the desktop display in a normal viewing angle. Because different alignments of liquid crystal molecules lead to different optical effects, when designing the displays, designers take the image quality of the display corresponding to the normal viewing angle as a main consideration. Therefore, when looking at the display in an oblique viewing angle, an observer can find the difference between images observed in the normal viewing angle and the images observed in the oblique viewing angle (such as brightness difference or chroma difference), and the difference becomes greater with increase of a viewing angle of the observer. In common liquid displays, TN liquid displays have the worst situation about the visual angle problem mentioned above.

Referring to FIG. 1, FIG. 1 is a diagram showing the structure of a liquid crystal layer 12 of a TN LCD 10. The TN LCD includes the liquid crystal layer 12, an upper alignment plate 14, and a lower alignment plate 16, wherein the lower alignment plate 16 is disposed closer to a backlight source than the upper alignment layer 14. The liquid crystal layer 12 includes top layer liquid crystal molecules 12a and bottom layer liquid crystal molecules 12b. The upper alignment plate 14, and the lower alignment plate 16 are used to align the top layer liquid crystal molecules 12a and the bottom layer liquid crystal molecules 12b. Therefore, a twisted structure having a pre-tilt angle is formed, wherein a terminal of a liquid crystal molecule having the pre-tilt angle is referred to as a "head terminal", and the other terminal thereof is referred to as an "end terminal". For example, the upper alignment layer 14 aligns the top layer liquid crystal molecules 12a, so that the top layer liquid crystal molecules 12a have the pre-tilt angle. For another example, the lower alignment layer 16 aligns the bottom layer liquid crystal molecules 12b, so that the bottom layer liquid crystal molecules 12b have the pre-tilt angle. The alignment directions of the alignment layers 14, 16 are not parallel to each other, so that the liquid crystal molecules locate there between are continuously twist-aligned in a direction from the alignment layer 14 toward the alignment layer 16. Accordingly, the twisted angle of the liquid crystal molecules can be defined as an angle between the head terminals of the bottom layer liquid crystal molecules and the end terminals of the top layer liquid crystal molecules.

In addition, the terminals of the liquid crystal molecules forming the twisted liquid crystal structure (including the head terminal of the bottom layer liquid crystal molecules 12b, the top layer liquid crystal molecules 12a, and the liquid crystal molecules located there between) define a viewing area. For common TN LCDs, a viewing angle range corresponds to such viewing area has bad optic characteristics. The viewing angle range is usually defined as a downward viewing angle for the observer. Of course, the viewing angle range with bad optic characteristics can also be defined as another viewing angle for the viewer (except for the normal viewing angle) depending on application demands.

For a TN LCD in which no viewing angle compensation mechanism is applied, images observed in an oblique viewing angle of the TN LCD have the problems regarding contrast (smaller than 10), gray level inversion, and color shift. In order to solve the problems of the TN LCD, compensation films are added in the TN LCD, thereby improving the quality of the images observed in the oblique viewing angle. The compensation films may be, for example common Fuji wide view films (WV films) developed by Fujifilms. The Fuji wide view films are common compensation films used in the TN LCD. However, great improvement about the contrast and less color shift can be achieved by the WV films, but only little improvement about gray level inversion is achieved by present compensation film. Therefore, the TN LCD is not considered as a wide visual angle LCD.

Therefore, there is a need to provide a display device which can improve the image quality problems about brightness and chroma, including contrast, deviation of gamma curve, and color shift issues, etc., and more particularly, when a TN LCD is applied in a display device, the novel display device can be used as a wide visual angle LCD and has advantages of lower cost, and higher response speed comparing to the LCDs in the LCD market.

SUMMARY

It is to be understood that both the foregoing general description and the following detailed description are by examples, and are intended to provide further explanation of the invention as claimed.

An aspect of the present invention is to provide a display device having advantages of good image quality uniformity for the viewing angles of the display device and low cost.

According to an embodiment of the present invention, the display device includes a display and a diffractive optical element. The display is used to show an image, wherein when looking at the display within a first viewing angle range, a user can see a first observed image on the display, and when looking at the display within a second viewing angle range, the user can see a second observed image on the display. The diffractive optical element is disposed in the lighting direction of the display to diffract the light constructing the first observed image to the second viewing angle range, thereby converting the first observed image into a third observed image and converting the second observed image into a fourth observed image at the same time.

According to another embodiment of the present invention, the display device includes a liquid crystal layer, an upper polarizer, a lower polarizer, and a diffractive optical element. The liquid crystal layer has a twist angle. The upper polarizer is disposed on a first side of the liquid crystal layer. The lower polarizer is disposed on a second side of the liquid crystal layer, wherein the second side is opposite to the first side. The diffractive optical element is disposed on the upper polarizer, wherein the upper polarizer is located between the diffractive optical element and the liquid crystal layer. The diffractive optical element comprises a diffraction grating having a first grating direction, and an angle between the first grating direction and a bisector of the twist angle is from 45 degrees to 135 degrees.

BRIEF DESCRIPTION OF THE DRAWINGS

The invention can be more entirely understood by reading the following detailed description of the embodiment, with reference made to the accompanying drawings as follows.

DETAILED DESCRIPTION

Figure 1:
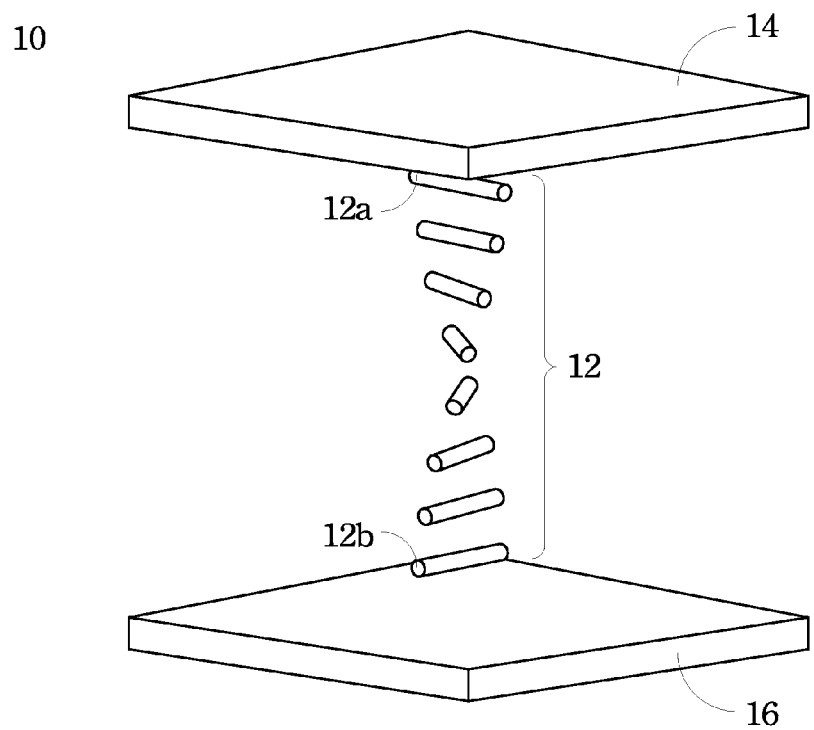
FIG. 1 is a diagram showing the structure of a liquid crystal layer of a TN LCD.

Reference will now be made in detail to the present embodiments of the invention, examples of which are illustrated in the accompanying drawings. Wherever possible, the same reference numbers are used in the drawings and the description to refer to the same or like parts.

First Embodiment

Figure 2:
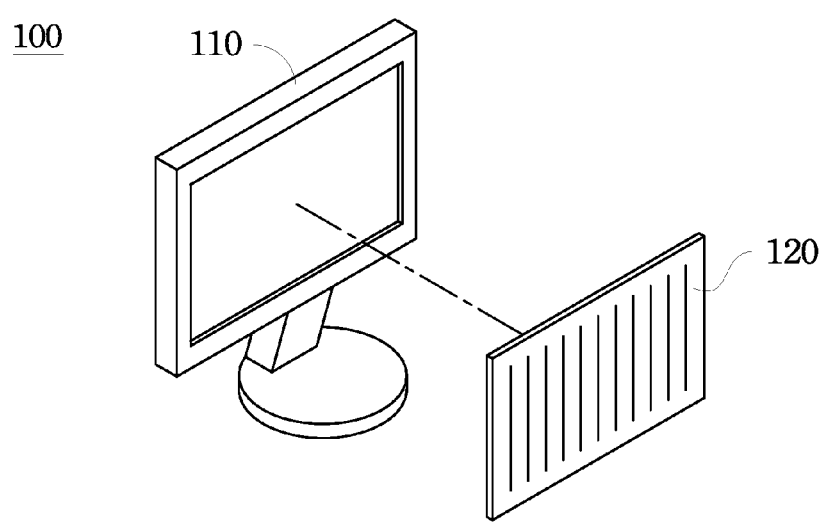
FIG. 2 is a diagram showing the structure of a display device in accordance with an embodiment of the present invention.

Referring to FIG. 2, FIG. 2 is a diagram showing the structure of a display device 100 in accordance with an embodiment of the present invention. The display device 100 includes a display 110 and a diffractive optical element 120. The display 110 can be a liquid crystal display (LCD), a plasma display, an organic light emitting display, an e-paper display, or another display used to show images, and the diffractive optical element 120 is disposed on a light output surface of the display 110 to diffract the light emitted by the display 110, wherein the diffractive optical element 120 can be a film having a diffraction grating (for example, a phase grating) disposed thereon.

In this embodiment, the emitting direction of the light of the display 110 is presented by a zenithal angle θ and an azimuthal angle ϕ. For example, a surface of the diffractive optical element 120 is defined as x-y plane, and the elongated direction of a positive z-axis is from the display 110 (orthogonal to the display) toward an observer of the display device 100 (out of the display device 100). Accordingly, viewing angles of the display device can be represented by (θ, ϕ), and a right viewing angle of the display device 100 can be represented by (α, 0). For another example, a left viewing angle of the display device 100 can be represented by (β, 180), wherein 0 degree ≤α, β≤90 degree. Similarly, an upper viewing angle of the display device 100 can be represented by (γ, 90), and a lower viewing angle of the display device 100 can be represented by (δ, 270), wherein 0 degrees ≤γ, δ≤90 degrees.

In addition, the direction of the diffraction grating is defined by the direction of lines connected by peaks (valleys) of the diffraction grating. In general, when an incident light is emitted to the diffraction grating in a normal direction, diffraction occurs, and the direction of the diffraction grating can also be defined by a direction which is orthogonal to the diffraction.

Figure 3A:
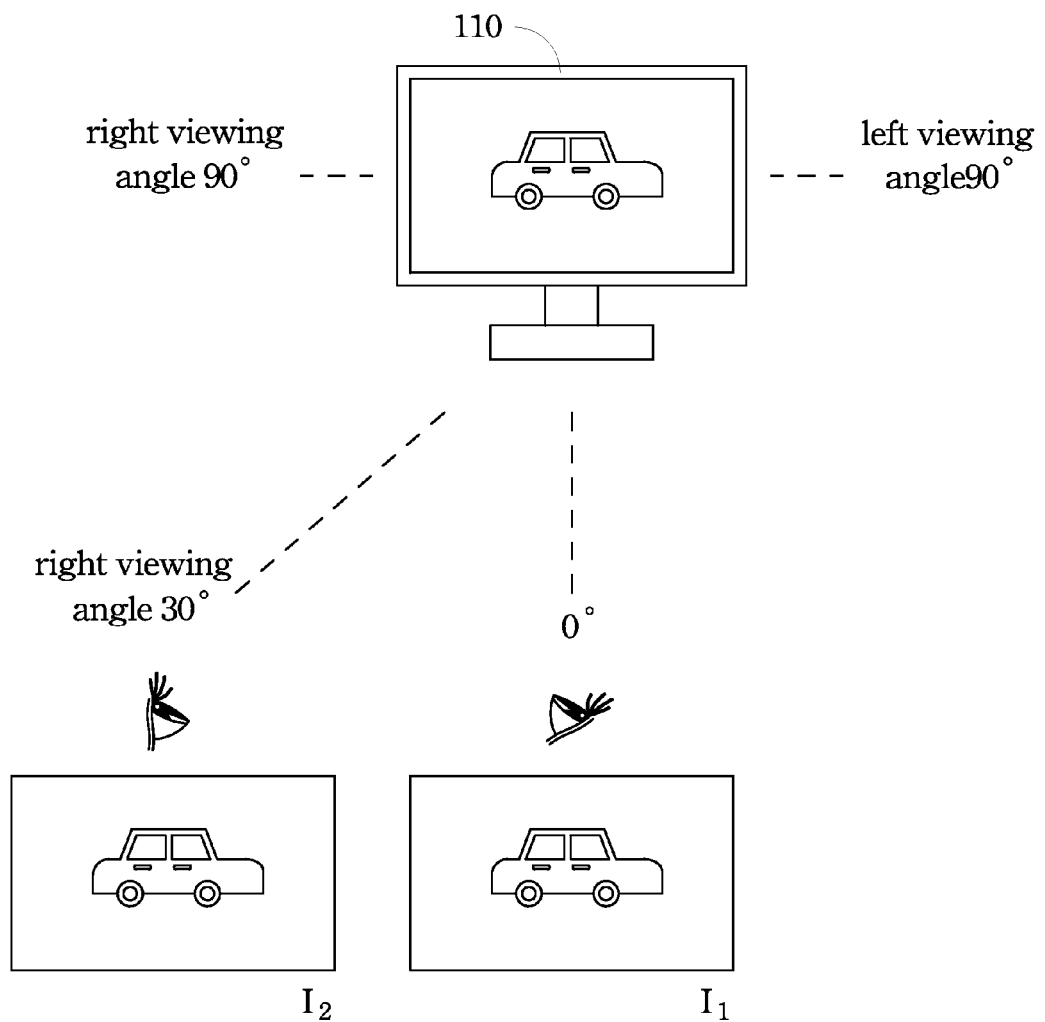
FIG. 3a is a diagram showing that a user looks at the display in a side viewing angle.
Figure 3B:
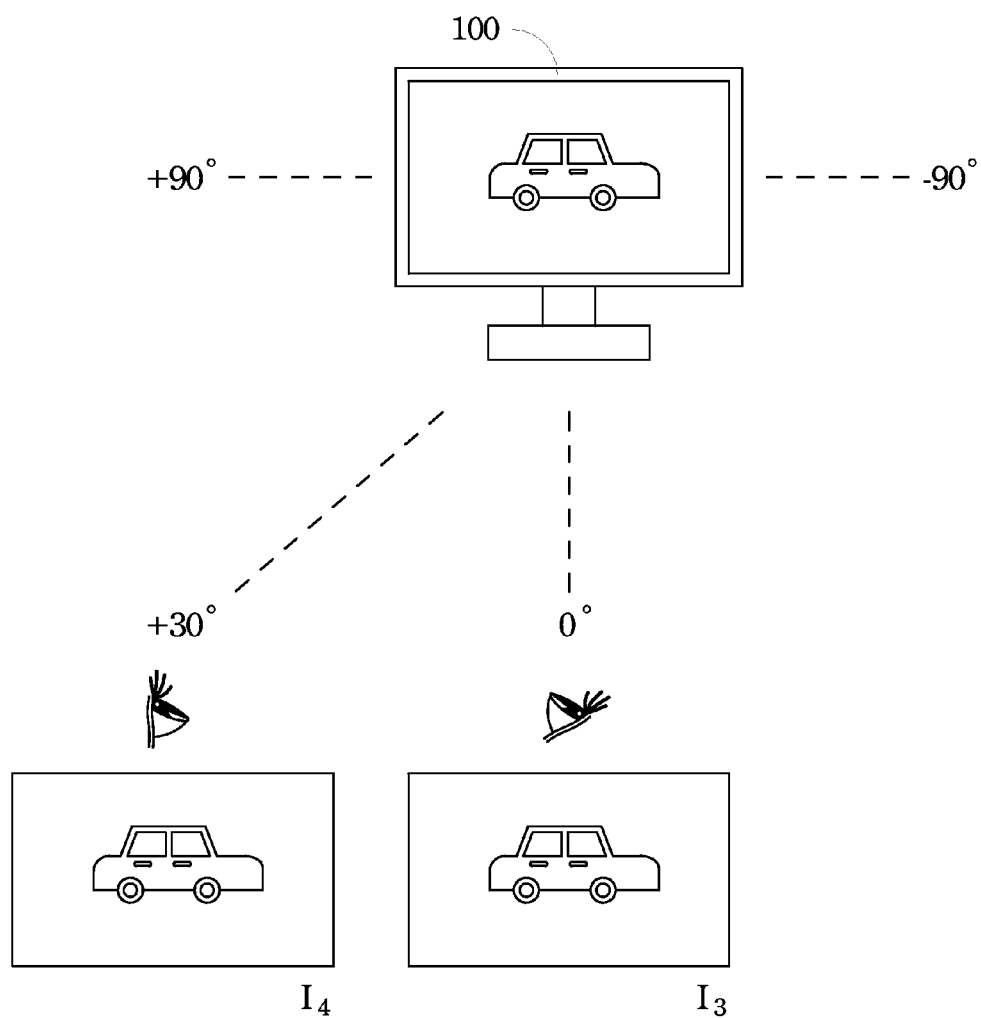
FIG. 3b is a diagram showing that the user looks at the display device in the side viewing angle in accordance with an embodiment of the present invention.

Referring to FIG. 3a and FIG. 3b simultaneously, FIG. 3a shows that a user looks at the display 110 in a side viewing angle, and FIG. 3b shows that the user looks at the display device 100 in the side viewing angle. In this embodiment, the display 110 is a liquid crystal display. It is assumed that a normal viewing angle of the display device 100 is 0 degrees, and a maximum value (or minimum value) of an oblique viewing angle of the display device 100 is 90 degrees (or −90 degrees). For the display 110, the image quality of a viewing angle from θ=90 degree to θ=10 worse than that of the normal viewing angle. This means that the user can sense problems about lower contrast, gray level inversion, deviation of gamma curve, or color shift, etc., when looking at the display 110 in a side viewing angle greater than 10 degrees. Of course, the base used for comparing image quality is not necessary to be the image corresponding to the normal viewing angle. For example, the base can be the image corresponding to an optimum viewing angle in a predetermined design.

In the following descriptions, the improvement for the image quality corresponding to a left viewing angle of 30 degrees is illustrated. For example, when looking at an area (such as at the cars in FIGS. 3a and 3b) of the display 110 in a normal viewing angle (0 degrees), the user obtains an observing image $I_1$ (also referred as normal viewing image $I_1$) accordingly, and when looking at the area of the display 110 in a left viewing angle of 30 degrees, the user obtains an observing image $I_2$ (also referred to as side viewing image $I_2$) accordingly. Because phase retardations caused by a liquid crystal layer of the display are different for the light emitted by a light source of the display, the hue, saturation, and brightness of a pixel of the normal viewing image are different from those of the same pixel of the side viewing image $I_2$ normal viewing. Accordingly, the image quality uniformity for the viewing angles is decreased. Therefore, this embodiment uses the diffractive optical element 120 to diffract light constructing the normal viewing image to left viewing angle (30 degrees), so as to use a portion of the normal viewing image $I_1$ to compensate the side viewing image $I_2$.

It is noted that in this embodiment, when the brightness difference of the pixels at the same locations of the images $I_1$ and $I_2$ is greater than 3% (based on the brightness of the pixel of the image the brightness of the images $I_2$ is considered being different from that of the images $I_1$. Further, when the difference of the values of color coordinates of the pixels at the same locations of the images $I_1$ and $I_2$ is greater than 0.1% (based on the value of the color coordinates of the pixel of the image the chroma of the images $I_2$ is considered being different from that of the images $I_1$. However, in the other embodiments, the threshold values can be modified in accordance with user's requirements. In addition, when the difference between a gamma value corresponding to a gamma curve of the normal viewing image and another gamma value corresponding to a gamma curve of the side viewing image $I_2$ is greater than 0.1, it is considered that the deviation of gamma curve occurs.

As shown in FIG. 3b, when looking at the display device 100 in a left viewing angle of 30 degrees, the user can obtain an observed image $I_4$ (also referred to as side viewing image $I_4$), and the side viewing image $I_4$ is equal to a component of image $I_2$ which is not diffracted out plus a component of image $I_1$ which is diffracted to the left viewing angle (30 degrees). It means that $I_4 = J\,I_2 + kI_1$, wherein each of J and k is a positive number smaller than 1. At the same time, because a portion of light constructing the image $I_1$ is diffracted to the left viewing angle, the normal viewing image $I_1$ is converted to another normal viewing image $I_3$ with lower brightness.

For the side viewing image $I_4$, when the component of the normal viewing image $I_1$ diffracted to the left viewing angle (i.e., $kI_1$) is strong, the image component $JI_2$ (not diffracted out) has less contribution to the side viewing image $I_4$ comparing to that of the image component $KI_1$. Thus, the difference between the side viewing image $I_4$ and the normal viewing image $I_1$ can be reduced, thereby improving the image quality of the side viewing image $I_4$. It is noted that the difference between the images $I_1$ and $I_4$ represents the differences between the brightness, hue, and saturation of the same pixels with different viewing angles and less difference between the images means better image quality uniformity for the viewing angles.

It is noted that the normal viewing angle of this embodiment is not limited to a viewing angle of 0 degrees. Because the user can obtain images with good image quality in a view angle range which is approximately 0 degrees, the normal viewing angle can be defined as an angle range from −10 degrees to 10 degrees, and the viewing angle corresponding to the compensated image is not limited to the side viewing angle of 30 degrees. The compensated viewing angle can be within a range including 30 degrees.

In the light diffraction mechanism, when a grating period of a diffraction grating is fixed, the shorter the wavelength is, the smaller the diffraction angle is. Accordingly, when the calculation of the diffraction of visible light (represented by blue light (wavelength of 450 nm), green light (wavelength of 550 nm), and red light (wavelength of 650 nm)) is considered, representative boundary conditions can be obtained through the estimation in the condition of light having a wavelength of 450 nm.

In this embodiment, for the light with a wavelength of 450 nm, when a grating period of the diffractive optical element 120 is smaller than 1.3 um, the light of a right viewing angle of 10 degrees (it is assumed that light corresponding to good image quality is in the range of 0±10 degrees, so that a right viewing angle of 10 degrees is a boundary) can be diffracted to a left viewing angle range which is at least 10 degrees to perform image compensation. If the light is diffracted to a left viewing angle range which is less than 10 degrees, no great benefit is obtained, because the image quality corresponding to the angle range less than 10 degrees is still good. In general, a first order diffraction of the light has greater contribution to the compensation for images, and a second order diffraction has less contribution though it is still helpful to the compensation for images. Therefore, when the first order diffraction of the light is used to compensate the small viewing angles, the second order diffraction of the light can be used for the compensation for images corresponding to large viewing angles, or a diffraction grating with a plurality of periods can be used for the compensation of images corresponding to the large angles, thereby solving the problems about bad image quality observed in the large viewing angles.

As mentioned above, for the purpose of diffracting the light corresponding to the normal viewing angle (with good image quality) to a larger angle range, the second order diffraction (or third order diffraction) of the light can be used for the compensation of the image in the other embodiments of the present invention. For example, when the user looks at the display 110, a maximum value of zenithal angle θ of 80 degrees is a limitation for the user to look at the display 110. When the grating period of the diffractive optical element 120 is approximately 0.15 um, the light of the second order diffraction corresponding to the normal viewing angle can be diffracted to a viewing angle range of at least 80 degrees, and meanwhile, the light of the first order diffraction of the light corresponding to the normal viewing angle is diffracted to a viewing angle range of about 70 degrees. Further, the embodiments of the present invention are not limited to the compensation for the images corresponding to side viewing angles. In the other embodiments of the present invention, the light corresponding to the normal viewing angle can be diffracted to top viewing angles, bottom viewing angles, or diagonal viewing angles, so as to solve the problems about image quality of those viewing angles, and for solving the problems, it is necessary to vary the direction of the diffraction grating of the diffractive optical element 120 with the azimuthal angle φ corresponding to the image needed to be compensated. In addition, when images corresponding to variable azimuthal angles are desired to be improved, diffraction gratings of the diffractive optical element 120 needed to have variable directions. For example, the diffractive optical element 120 may have single layer structure on which a plurality of gratings with variable directions are disposed, or may have multiple layer structure on which gratings with variable directions are respectively disposed.

For an outdoor bulletin board, the quality of the images corresponding to the bottom viewing angles is important, but the quality of the images corresponding to the normal viewing angle is not important. Therefore, in addition to the improvement of the quality of the images corresponding to the bottom viewing angles, the brightness of the images corresponding to the normal viewing angle can be transferred to the images corresponding to the bottom viewing angle as much as possible. In this case, although the display device (outdoor billboard) itself is not a display with good uniformity for the images corresponding to all viewing angles, the display device is very useful for special purposes.

It can be known from the above description that the grating period of the diffractive optical element 120 is in the range from 0.15 um to 1.3 um, thereby improving the image quality problems corresponding to variable side viewing angles. Further, an angle range corresponding to good image quality is from −10 degrees to 10 degrees, and an angle range corresponding to bad image quality is at least 30 degrees. Observers of the display device usually look at the display device in a side viewing angle range which is at most 60 degrees, and therefore the first order diffraction light corresponding to the normal viewing angle is desired to be diffracted to an angle range of θ=30 degrees to 60 degrees, and the light in the viewing angle range of 0±10 degrees, or the second order diffraction light corresponding to the normal viewing angle is desired to be diffracted to angle ranges other than that of θ=30 degrees to 60 degrees, and meanwhile, the period of the grating can be from 0.26 um to 0.78 um. When the compensation for the images corresponding to a large angle range (>60 degrees) is not important, and it is desired to have the first order diffraction light corresponding to an angle of 10 degrees diffracted to a viewing angle range of θ=30 degrees to 60 degrees, the period of the grating can be 0.29 um to 1.13 um. In general, the diffractive optical element 120 can be a symmetric structure. It means that the diffractive optical element 120 with symmetric structure performs symmetric diffraction. In other words, the diffractive optical element 120 can perform compensation for the images corresponding to two symmetric viewing angle ranges at the same time. For example, the images of a left viewing angle of 30 degrees and a right viewing angle of 30 degrees can be compensated at the same time. In addition, the diffractive optical element 120 can have a non-symmetric structure to provide compensation to the images corresponding to single viewing angles. For example, a blaze grating can be used to compensate the images corresponding to single viewing angles. Further, the diffraction efficiency corresponding to different diffraction directions can be designed in accordance with the grating structure.

Figure 4A:
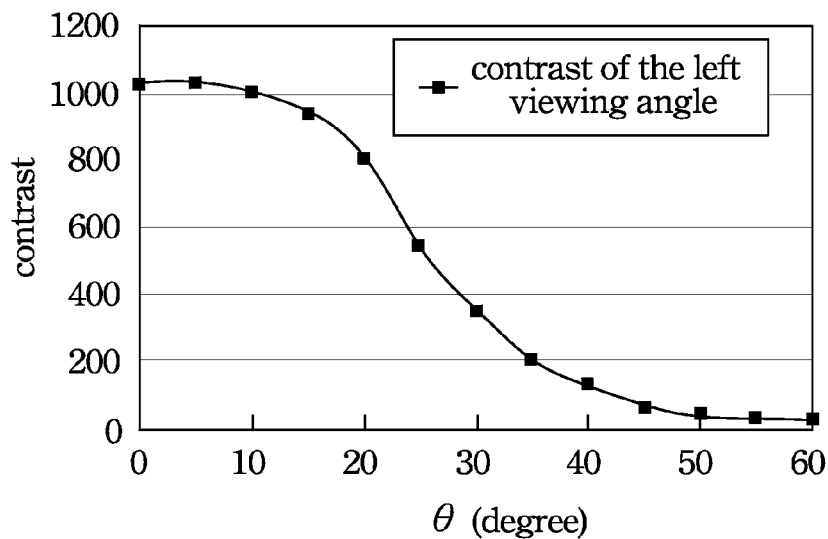
FIG. 4a is a curve diagram showing the relationship between left (right) viewing angles and contrast corresponding to a typical TN display on which a typical compensation film is added.
Figure 4B:
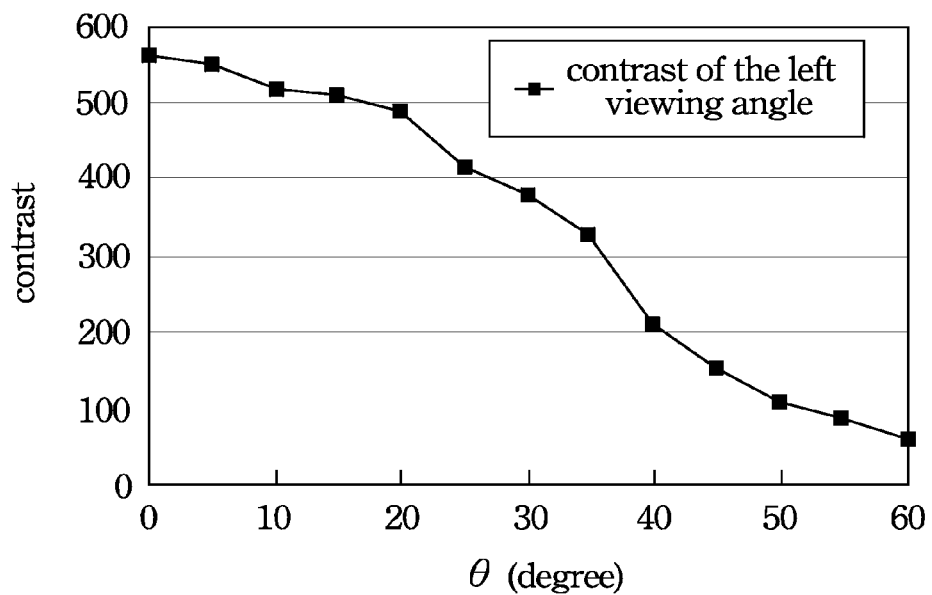
FIG. 4b is a curve diagram showing that the relationship between left (right) viewing angles and contrast corresponding to the display device in accordance with an embodiment of the present invention.

Referring to FIG. 4a and FIG. 4b simultaneously, FIG. 4a shows the relationship between left (right) viewing angles and contrast corresponding to a typical (conventional) TN display on which a conventional compensation film is added, and FIG. 4b shows showing that the relationship between left (right) viewing angles and contrast corresponding to the display device 100 (with TN display 110 including a conventional compensation film) including the diffractive optical element 120 of the present embodiment, wherein a "main" direction of the gratings on the diffractive optical element 120 of the display device 100 is ψ=90 degrees (or ψ=270 degrees) (observing at the X-Y plane). It can be known from FIG. 4a that the contrast of the typical (conventional) display is decreased to half of that corresponding to normal viewing angle when the contrast corresponds to a left viewing angle of 25 degrees. It means that a half-height width of the contrast of the typical (conventional) display is 25 degrees. By contrast, FIG. 4b shows that the contrast of the display device 100 of this embodiment is decreased to half of that corresponding to normal viewing angle, when the contrast corresponds to a left viewing angle of 35 degrees. It means that a half-height width of contrast of the display device is 35 degrees. Because the half-height width of the contrast of the display device 100 is greater than that of the typical (conventional) display, a great improvement is provided on the contrast corresponding to side viewing angles of the display device 100. Further, the contrast values of the typical (conventional) display are substantially smaller than 10 when the left viewing angle is larger than 60 degrees. Therefore, compensation for the images corresponding to left viewing angle of 25 degrees can be made.

Second Embodiment

Figure 5A:
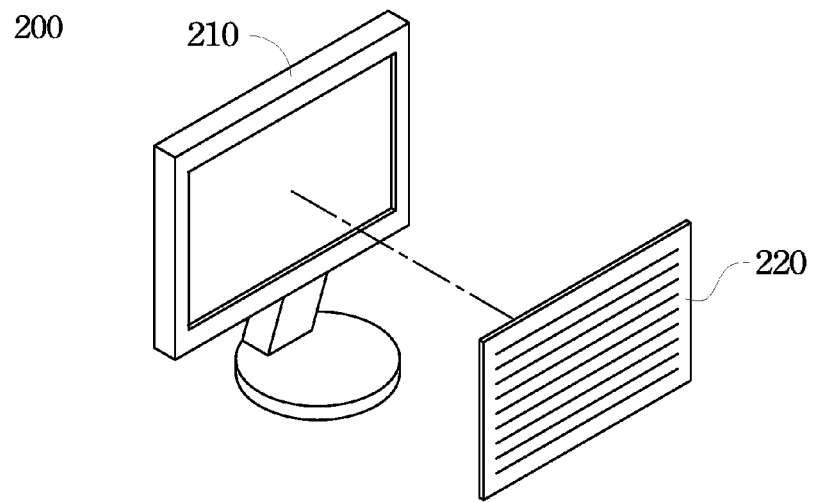
FIG. 5a is a diagram showing the structure of a display device in accordance with an embodiment of the present invention.

Referring to FIG. 5a, FIG. 5a shows the structure of a display device 200 in accordance with an embodiment of the present invention. The display device 200 is similar to the display device 100. However, the diffraction grating disposed on a diffractive optical element 220 of the display device 200 has different grating direction from the diffraction grating disposed on the diffractive optical element 120 of the display device 100. In this embodiment, the main direction of the diffraction grating of the diffractive optical element 220 is 0 degrees (or 180 degrees), thereby compensating images corresponding to a top viewing angle and/or a bottom viewing angle of the display 210. In general, users rarely look at display devices in the bottom viewing angle. However, for display devices used for special purposes, such as large outdoor bulletin boards, demo machines on exhibition holders, tablet personal computers, etc., the users usually look at the display devices in the bottom viewing angle. However, a serious gray inversion phenomenon can be observed, when the users look at the display devices (such as TN LCDs) in the bottom viewing angle.

Figure 5B:
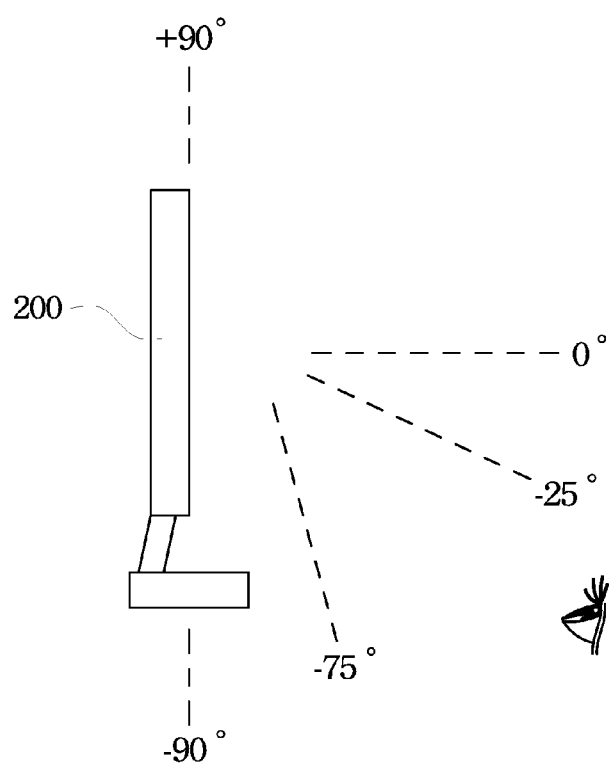
FIG. 5b is a diagram showing that a user looks at the display device in the bottom viewing angle in accordance with an embodiment of the present invention.

Referring to FIG. 5b, FIG. 5b shows that a user looks at the display device 200 in the bottom viewing angle, wherein a normal viewing angle is defined as 0 degrees, and the top viewing angle and the bottom viewing angle are respectively defined as (γ, 90) and (δ, 270), wherein 0 degrees ≤γ, δ≤90 degrees (in this case, because of the illustration of the Figs, the zenithal angle θ is redefined as −90 degrees ≤θ≤90 degrees, and when 90 degrees ≥θ≥0 degrees, it is considered as the top viewing angle, and when −90 degrees ≤θ≤0 degrees, it is considered as the bottom viewing angle.). In the case of a TN LCD on which the wide viewing angle compensation films are disposed, the gray inversion occurs in a viewing angle of −25 degrees (a bottom viewing angle of 25 degrees), and the contrast values is decreased to 10 in a viewing angle of at most −75 degrees (a bottom viewing angle of 75 degrees). Therefore, the diffractive optical element 220 in this embodiment is performed to compensate the images corresponding to the viewing angles of −25 degrees and 75 degrees, or the first order diffraction light and even higher order diffraction light is used to compensate the images corresponding to the viewing angles of −25 degrees and −75 degrees, or a diffraction grating having variable periods is performed to compensate the images corresponding to the viewing angles of −25 degrees and −75 degrees.

Figure 5C:
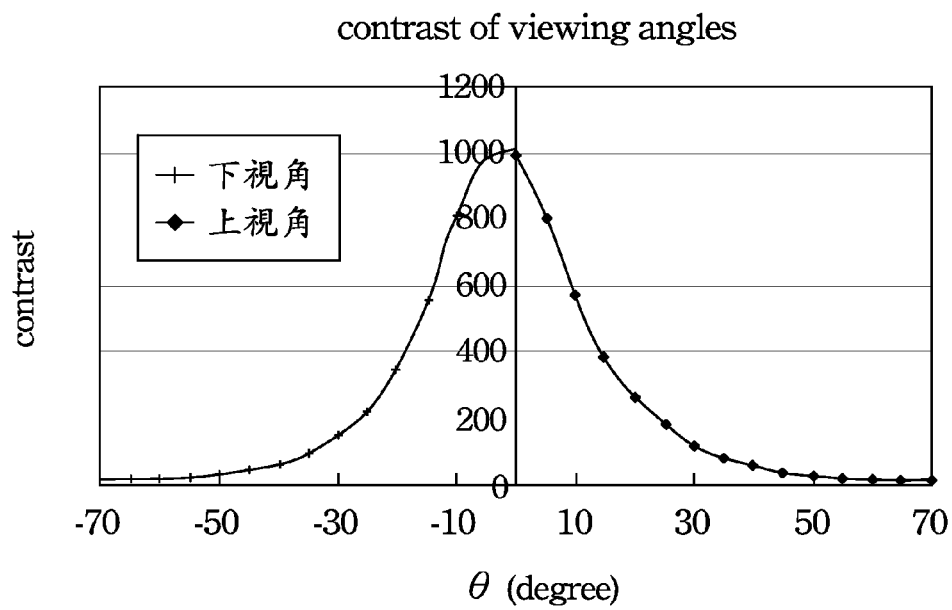
FIG. 5c is a curve diagram showing the relationship between top (bottom) viewing angles and contrast corresponding to a typical TN display on which a typical compensation film is added.

In addition, in the other embodiments of the present invention, images corresponding to a bottom viewing angle range of at least 15 degree are compensated because the half-height width of the contrast corresponding to the bottom viewing angles is 15 degree (see FIG. 5c). Further, the half-height width of the contrast corresponding to the top viewing angles is 10 degree (see FIG. 5c) so that the image compensation can be performed on the images corresponding to a top viewing angle range of at least 10 degree.

Figure 5D:
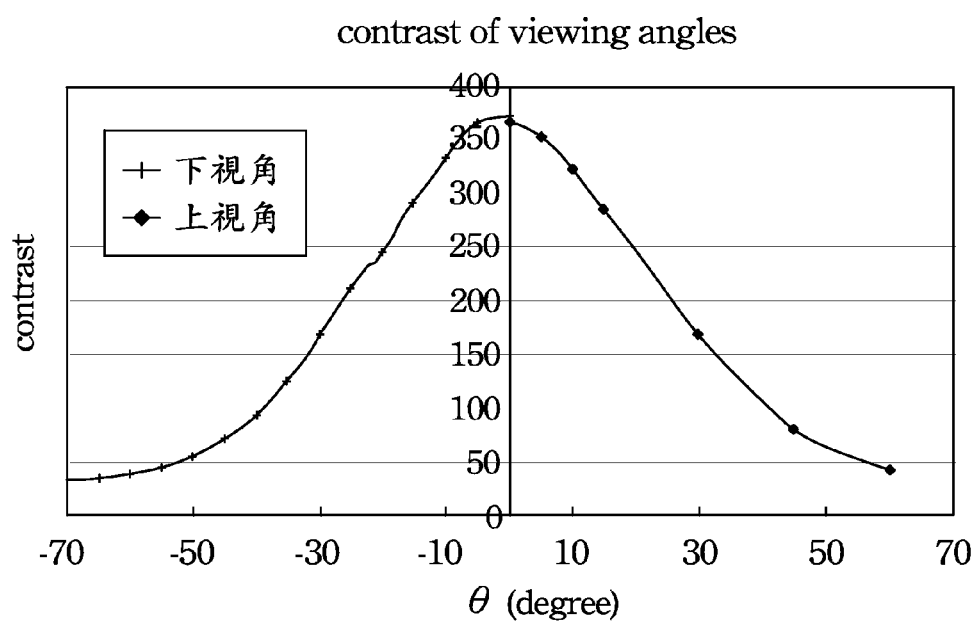
FIG. 5d is a curve diagram showing that the relationship between top (bottom) viewing angles and contrast corresponding to the display device in accordance with an embodiment of the present invention.

Referring to FIG. 5c and FIG. 5d simultaneously, FIG. 5c shows the relation between top (bottom) viewing angles and contrast corresponding to a typical (conventional) TN display on which a conventional compensation film is used, and FIG. 5d shows that the relation between the top (bottom) viewing angles and the contrast corresponding to the display device 200 (with TN display 210 on which the conventional compensation film is used) including the diffracted optical element 220. It can be known from FIG. 5c and FIG. 5d that the half-height width of the contrast of the display device 200 is greater than that of the typical (conventional) display.

In addition, for a TN LCD, the gray inversion can be observed in a top viewing angle range of at lest 35 degree, and the contrast values of the typical (conventional) display are substantially smaller than 10 when the left viewing angle is at least 65 degree. Therefore, the diffractive optical element 220 can include diffraction gratings for compensation for the images corresponding to viewing angles of −25 degree, −75 degree, 35 degree, and 65 degree (bottom viewing angles and top viewing angles). These diffraction gratings can be designed on multiple films in a one to one manner, or on a single film.

Figure 6A:
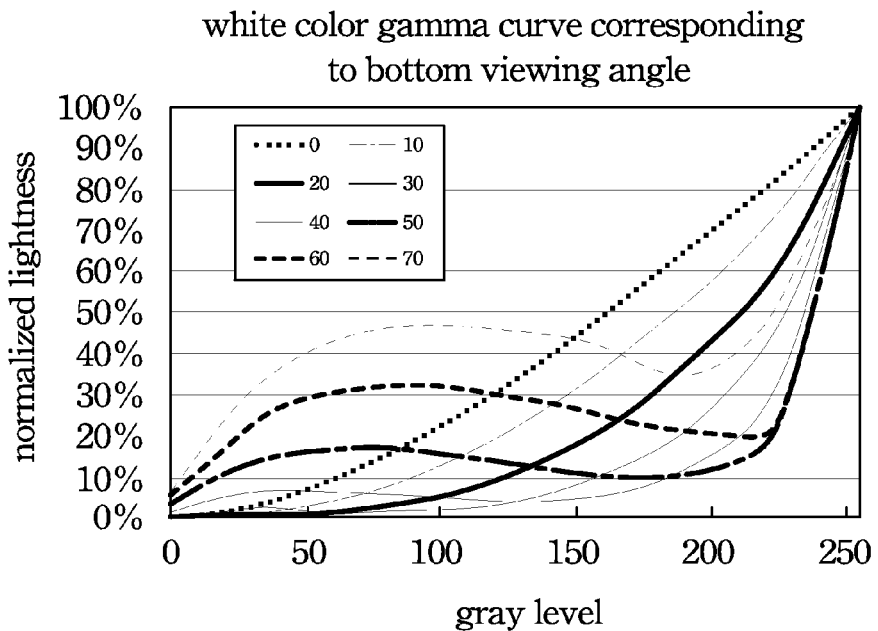
FIG. 6a is a curve diagram showing the relationship between gray levels and brightness transmitting liquid crystal corresponding to variable zenith angles of a typical TN display on which a typical compensation film is added.
Figure 6B:
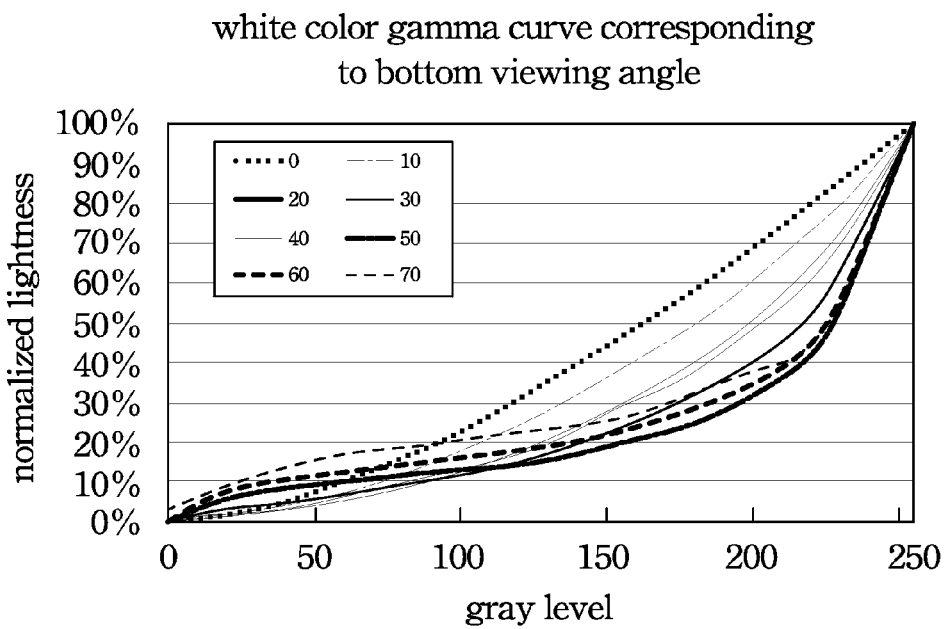
FIG. 6b is a diagram showing gamma curves corresponding to variable zenith angles of the display device in accordance with an embodiment of the present invention.

Referring to FIG. 6a and FIG. 6b simultaneously, FIG. 6a shows the relation between gray levels and transmittance of liquid crystal (i.e., gamma curves corresponding to variable zenith angles) corresponding to variable zenithal angles (bottom viewing angles) of a typical (conventional) TN display on which a conventional compensation film is disposed, and FIG. 6b shows gamma curves corresponding to variable zenithal angles (bottom viewing angles) of the display device 200 (with TN display 210 on which the conventional compensation film is added) including the diffractive optical element 220. It can be known that the typical (conventional) display has serious gray level inversion and serious deviation of gamma curves (wherein a portion of the deviation is caused by the lower transmittance of middle gray level in a large viewing angle), particularly in a larger viewing angle. By contrast, it can be known from FIG. 6b that the display device 200 of this embodiment does not have gray level inversion, and the deviation of gamma curves of the display device 200 is improved.

In addition, it can be known from the above embodiments that the right/left viewing angles and the top/bottom viewing angles of the TN display have different problems. Therefore, when a diffraction grating having multiple directions and multiple periods are used, the diffraction gratings can be designed separately in accordance with different problems. Further, in addition to the diffraction gratings having multiple directions, the light source of the TN display may be helpful to the compensation for images corresponding to variable viewing angles not perpendicular to the direction of the diffraction grating of the diffractive optical element 220, because the light source (of a backlight module) is not a entirely collimation light source.

Figure 6C:
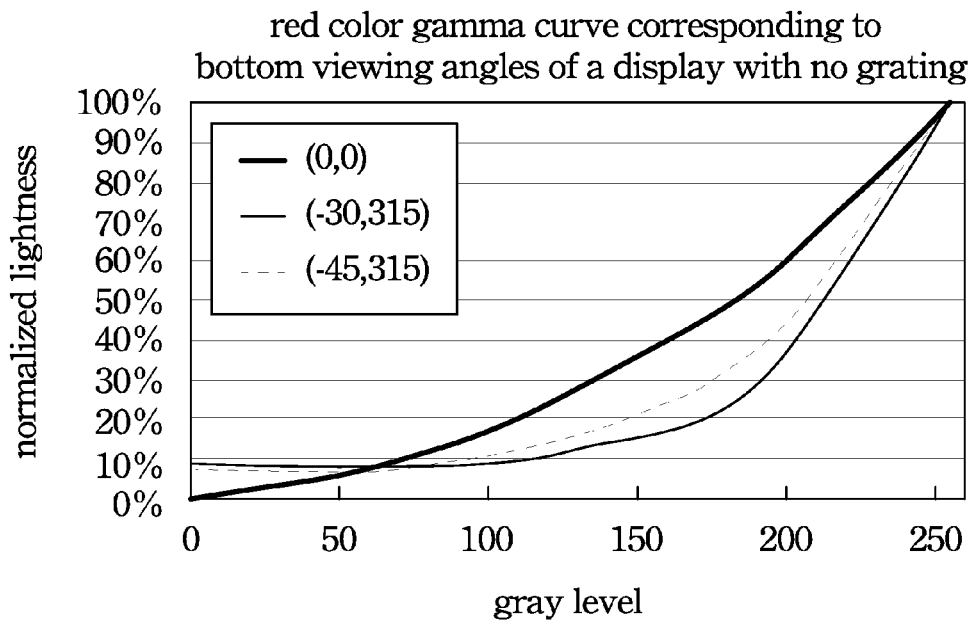
FIG. 6c is a diagram showing gamma curves corresponding to a diagonal-bottom viewing angle of 315 degrees of a typical display.
Figure 6D:
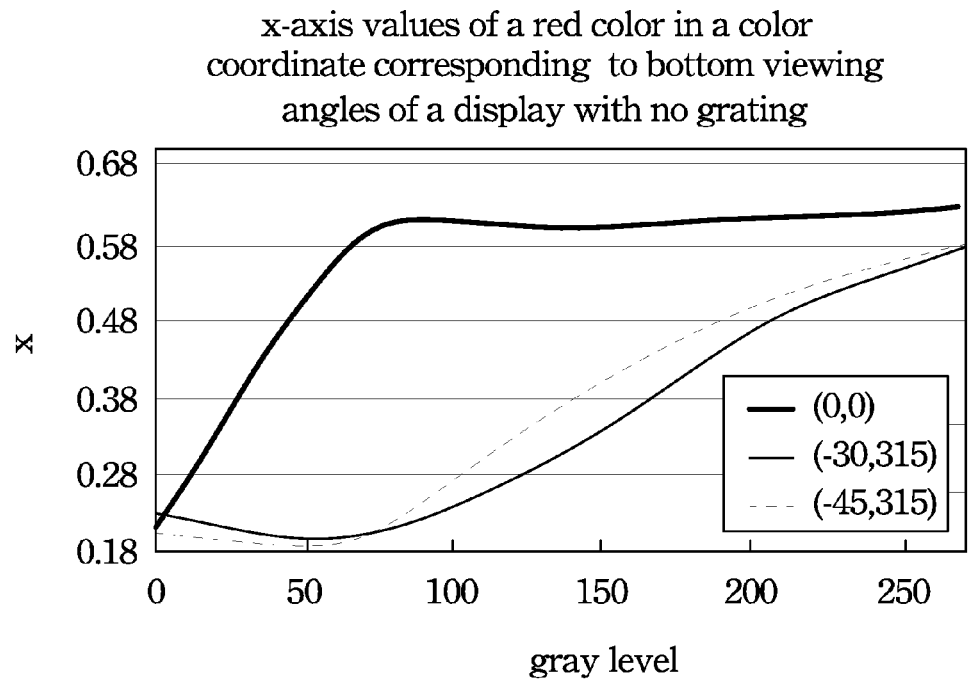
FIG. 6d is a curve diagram showing the relation between x-axis values of a red color in a color coordinate and values of gray level.
Figure 6E:
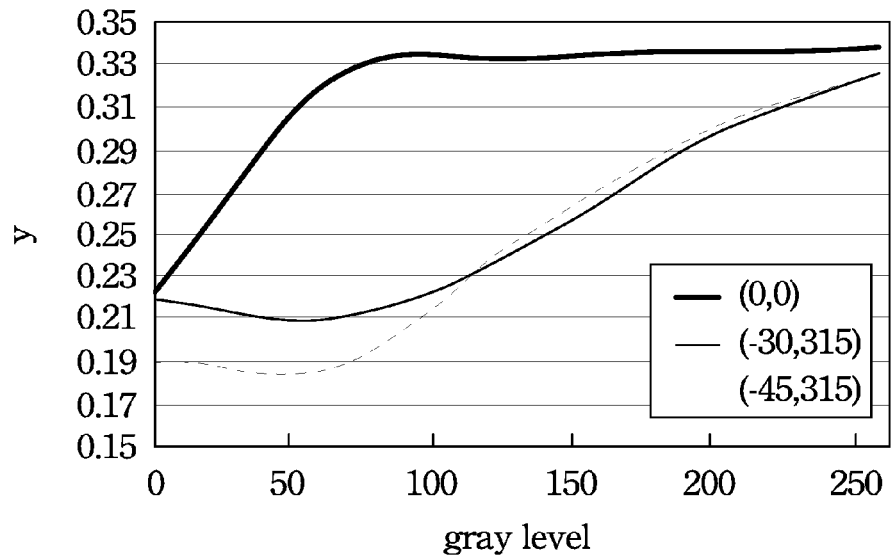
FIG. 6e is a curve diagram showing the relation between y-axis values of a red color in a color coordinate and values of gray level.

Referring to FIGS. 6c to 6e, FIG. 6c shows a gamma curve corresponding to a diagonal-bottom viewing angle of 315 degree of a typical (conventional) display. FIG. 6d shows the relation between x value of a red color in a color coordinate and the gray level value, wherein the relation corresponds to the diagonal-bottom viewing angle of 315 degree of the typical (conventional) display. FIG. 6e shows the relation between y value of a red color in a color coordinate and gray level value, wherein the relation corresponds to the diagonal-bottom viewing angle of 315 degree of the typical (conventional) display. It can be known from FIGS. 6c to 6e that the image quality corresponding to the diagonal-bottom viewing angle of 315 degree greatly worse than that corresponding to the normal viewing angle.

Figure 6F:
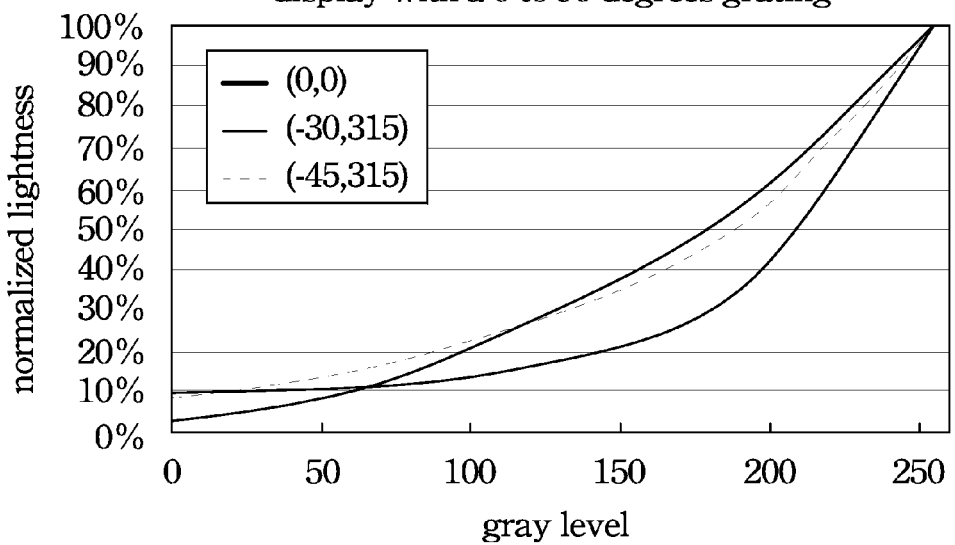
FIG. 6f is a diagram showing gamma curves corresponding to a diagonal-bottom viewing angle of 315 degrees of the display device 200 in accordance with an embodiment of the present invention.
Figure 6G:
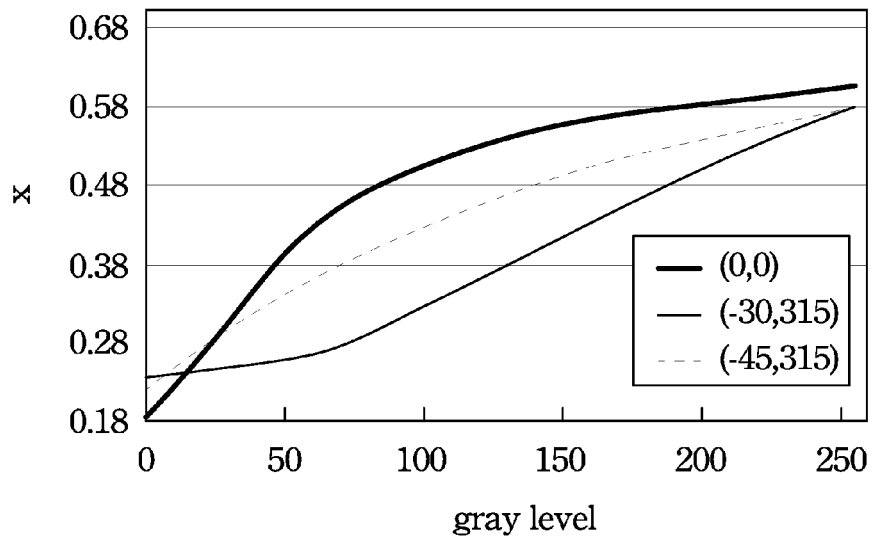
FIG. 6g is a curve diagram showing the relation between x-axis values of a red color in a color coordinate and values of gray level in accordance with an embodiment of the present invention.
Figure 6H:
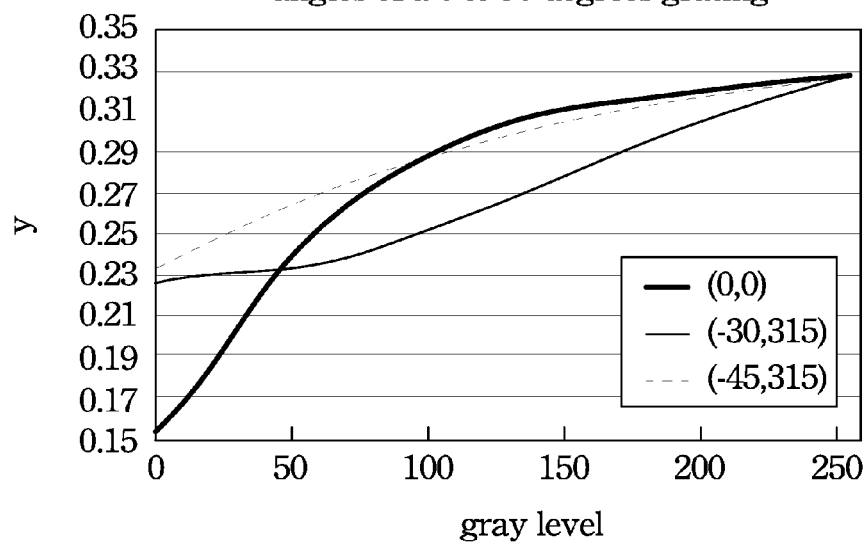
FIG. 6h is a curve diagram showing the relation between y-axis values of a red color in a color coordinate and values of gray level in accordance with an embodiment of the present invention.

Referring to FIGS. 6f to 6h, FIG. 6f shows a gamma curve corresponding to a diagonal-bottom viewing angle of 315 degree of the display device 200. FIG. 6g shows the relation between x value of a red color in a color coordinate and gray level value, wherein the relation corresponds to the diagonal-bottom viewing angle of 315 degree of the display device 200. FIG. 6h shows the relation between y value of a red color in a color coordinate and gray level value, wherein the relation corresponds to the diagonal-bottom viewing angle of 315 degree of the display device 200. It can be known from FIGS. 6f to 6h that the image quality corresponding to the diagonal-bottom viewing angle of 315 degree and the normal viewing angle of display device 200 are improved comparing to those shown in FIGS. 6f to 6h, because the light source (of a backlight module) is not a entirely collimation light source, and it is helpful to the compensation corresponding to viewing angles not perpendicular to the direction of the diffraction grating of the diffractive optical element 220.

In addition, when the diffractive optical element 220 has diffraction gratings with multiple directions, such as gratings have directions perpendicular to each other (i.e., 0 degree and 90 degree), the diffractive optical element 220 are helpful to the compensation corresponding to viewing angles not perpendicular to the grating directions, such as a right-top viewing angle ($\psi$ is from 0 degree to 90 degree), a left-top viewing angle ($\psi$ is from 90 degree to 180 degree), a left-bottom viewing angle ($\psi$ is from 180 degree to 270 degree), and a right-bottom viewing angle ($\psi$ is from 270 degree to 360 degree).

Third Embodiment

Figure 7A:
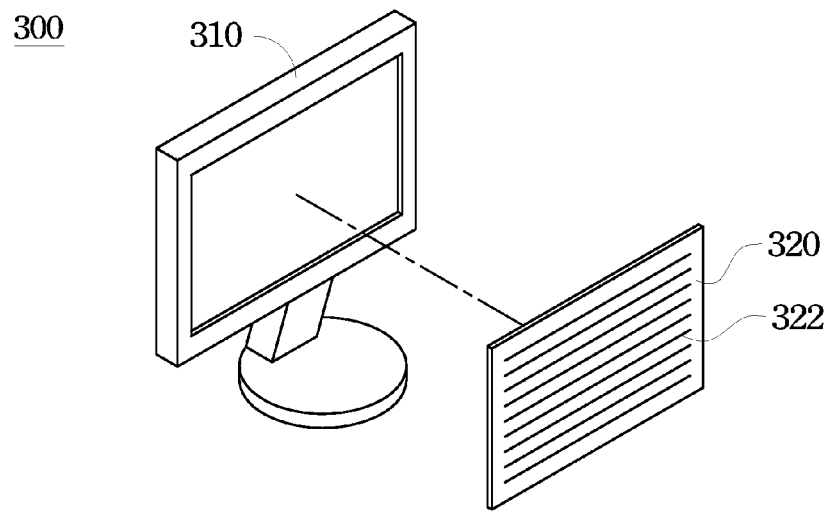
FIG. 7a is a diagram showing the structure of a display device in accordance with an embodiment of the present invention.
Figure 7B:
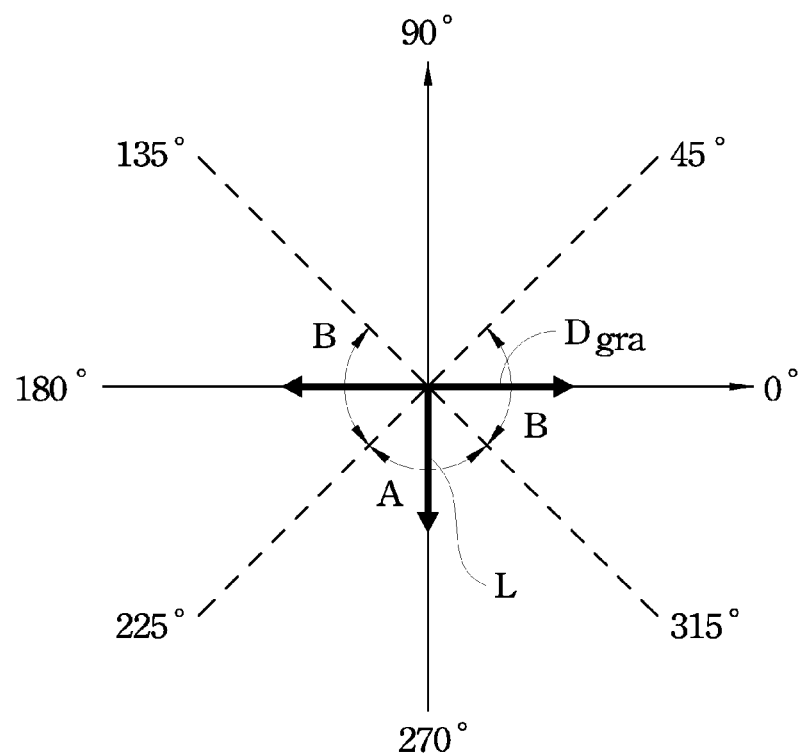
FIG. 7b is a diagram showing the relation between a direction of a diffraction grating on a diffractive optic element and a twist angle of liquid crystal molecules in accordance with an embodiment of the present invention.

Referring to FIG. 7a and FIG. 7b, Fig, 7a shows the structure of a display device 300 in accordance with an embodiment of the present invention. FIG. 7b shows the relation between a direction of a diffraction grating on a diffractive optic element 320 and a twist angle of liquid crystal molecules. The display device 300 includes a display 310 and the diffractive optic element 320, wherein the display device 300 is similar to the display device 100, but display 310 can be a TN or STN LCD. The twist angle of the liquid crystal molecules thereof is not limited to 90 degree. The diffractive optic element 320 includes a diffraction grating 322, and the direction of the diffraction grating 322 is perpendicular to a bisector of the twist angle (the liquid crystal molecules are continuously twist-aligned in a direction from head terminals of bottom layer liquid crystal to end terminals of top layer liquid crystal and through middle liquid crystal molecules). For example, in this embodiment, an alignment direction (in the case of rubbing alignment) of an alignment layer close to a backlight source of the display 310 is 315 degree, and another alignment layer far away from the backlight source of the display 310 is 45 degree. Therefore, liquid crystal heads of the liquid crystal molecules of the display 310 are twisted from 315 degree (the head terminals of bottom layer liquid crystal molecules) to 225 degree (the end terminals of top layer liquid crystal molecules) through the continuous twisting of the middle liquid crystal molecules. Accordingly, the bisector L of the twisted angle A is aligned to 270 degree, and the grating direction $D_{gra}$ of the grating 322 is at $\psi=0$ degree or $\psi=180$ degree, or referred to the direction $\psi=/180$ degree.

For another example, in the other embodiments of the present invention, when the alignment direction of the alignment layer close to the backlight source is 270 degree, and the another alignment layer far away from the backlight source is 0 degree, the bisector L of the twisted angle A is aligned to 225 degree, and the grating direction $D_{gra}$ of the grating 322 is $\phi=135$ to $\phi=315$ degree.

In addition, the grating direction $D_{gra}$ has a tolerance range B. For example, when the grating direction $D_{gra}$ is 0 degree or 180 degree, the grating direction $D_{gra}$ can be in the range of 315 to 45 degree or 135 to 225 degree.

Because the pre-tilt angle of the liquid crystal molecules leads to the bad image quality of LCDs, the grating direction $D_{gra}$ of the diffractive optic element 320 is determined in accordance with the twist angle of the liquid crystal molecules, thereby to improve the image quality with respect to the viewing angles.

It is noted that for the TNLCD or STN LCD, when the polarization directions of polarizers are 0 degree and 90 degree, the user of the LCD may find serious gray level inversion in a left viewing angle or a right viewing angle (it depends on the value of the twist angle A (180 to 270 degree or 270 to 360 degree), the viewing angles observed in the left viewing angle and the right viewing angle are asymmetric. Accordingly, the polarizers having polarization directions of 0 degree and 90 degree cannot be applied in the TN LCD. However, in this embodiment, the grating direction of the diffractive optic element 320 is varied in accordance with the twist angle of the liquid crystal molecules, even though the polarizers having polarization directions of 0 degree and 90 degree are applied in the TN LCD, the asymmetric viewing angles of the TN LCD in the left viewing angle and the right viewing angle can be greatly improved. Thus the symmetry of the left viewing angle and the right viewing angle are greatly improved and acceptable by human eyes. For the TN and STN LCDs, when the polarizers having polarization directions of 0 degree and 90 degree are applied therein, the cost of the polarizers or compensation films of the TN and STN LCDs is reduced.

Fourth Embodiment

Figure 8:
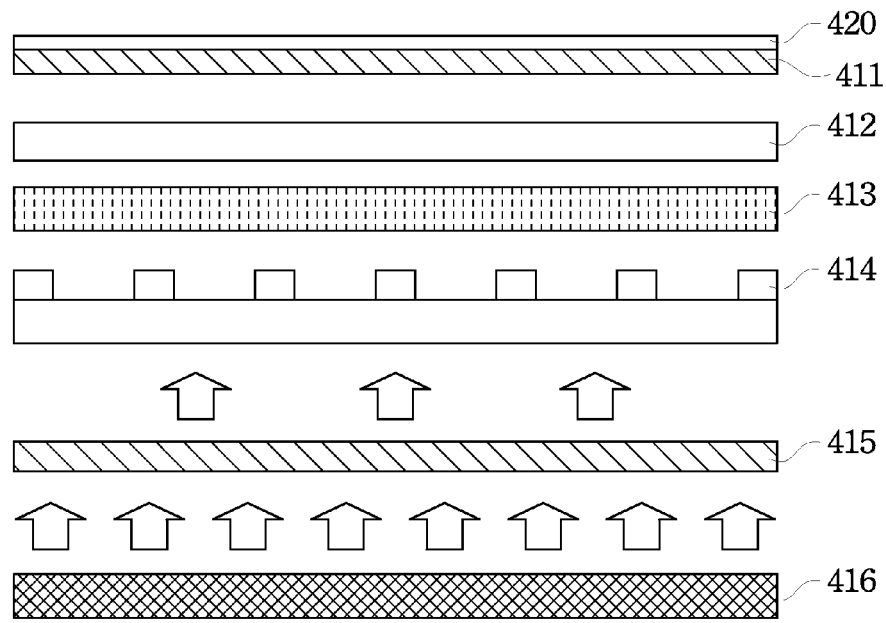
FIG. 8 is a diagram showing the structure of a display device in accordance with an embodiment of the present invention.

Referring to FIG. 8, FIG. 8 shows the structure of a display device 400. The display device 400 is similar to the display device 100, but a diffractive optic element 420 of the display device 400 is disposed on an upper polarizer 411 of a display 410. As shown in FIG. 8, the liquid crystal display 410 includes an upper polarizer 411, color filters 412, a liquid crystal layer 419, a thin film transistor array 414, a lower polarizer 415, and a backlight module 416. The diffractive optical element 420 is disposed on the upper polarizer 411. In this embodiment, the diffractive optical element 420 is a film having a plurality of diffraction gratings (having multiple periods and directions) and can be adhered to the polarizer 411 with glue. In the other embodiments of the present invention, the diffractive optical element 420 is disposed on the polarizer 411 by engaging mechanism or other ways, for example.

It is noted that a common polarizer usually has a polarization layer. The polarization layer is usually formed by poly vinyl alcohol (PVA). The diffractive optical element 420 is disposed out of the polarization layer.

Fifth Embodiment

Figure 9:
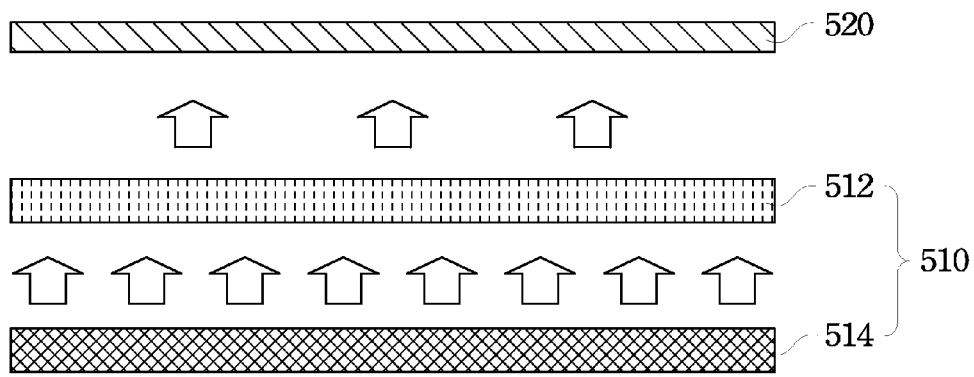
FIG. 9 is a diagram showing the structure of a display device in accordance with an embodiment of the present invention.

Referring to FIG. 9, FIG. 9 shows a display device 500. The display device 500 includes display 510 and diffractive optic element 520. The display 510 is a TN LCD and includes a liquid crystal panel 512 and a backlight module 514. The display device 500 is similar to the display device 100, however, the backlight module 514 can provide collimation light.

In the display device 500, the lights corresponding to normal viewing angles are diffracted to side viewing angles to compensate the images corresponding to side viewing angles, but the lights corresponding to the side viewing angles may interfere the lights corresponding to normal viewing angles accordingly. Thus, the image quality corresponding to the normal viewing angles is degraded. Therefore, the backlight module 514 providing collimation light sources is applied in the display device 500 of the present invention, and the backlight module 514 does not emit any lights to on the side viewing angles of the display device 500. Thus, the display 510 has no lights corresponding to the side viewing angles. Accordingly, the images corresponding to the normal viewing angles is not interfered yet, and the image quality of the images corresponding to the side viewing angle can be better because of the degradation of the lights emitted to the side viewing angle.

In addition, when the diffractive optical element 520 has diffraction gratings having multiple directions, such as gratings have directions perpendicular to each other (i.e., 0 degree and 90 degree), the diffractive optical element 520 are helpful to the compensation corresponding to viewing angles not perpendicular to the grating directions, such as a right-top viewing angle ($\psi$ is from 0 degree to 90 degree), a left-top viewing angle ($\psi$ is from 90 degree to 180 degree), a left-bottom viewing angle ($\psi$ is from 180 degree to 270 degree), and a right-bottom viewing angle ($\psi$ is from 270 degree to 360 degree).

Sixth Embodiment

Figure 10A:
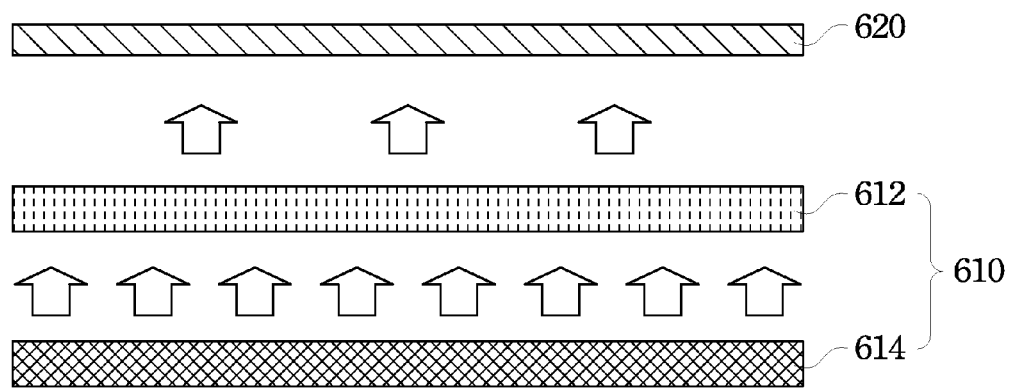
FIG. 10a is a diagram showing the structure of a display device in accordance with an embodiment of the present invention.

Referring to FIG. 10a, FIG. 10a is a diagram showing the structure of a display device 600. The display device 600 includes a display 610 and a diffractive optic element 620. The display 610 is a TN LCD and includes a liquid crystal panel 612 and a backlight module 614. The display device 600 is similar to the display device 500, but the backlight module 614 of the display 610 provides slightly collimated light.

In the display device 500, the backlight module 514 of the display 510 is a collimation light source, so that the display 510 has no light corresponding to the side viewing angle. However, great cost is required to have the light of the backlight module entirely collimated. Therefore, this embodiment uses the backlight module 614 providing slightly collimated light. Although the light provided by the backlight module 614 are not entirely collimated, the image quality uniformity for viewing angles of the display device 600 is highly improved comparing to that for viewing angles of a display device using a typical (conventional) light source not collimated.

Figure 10B:
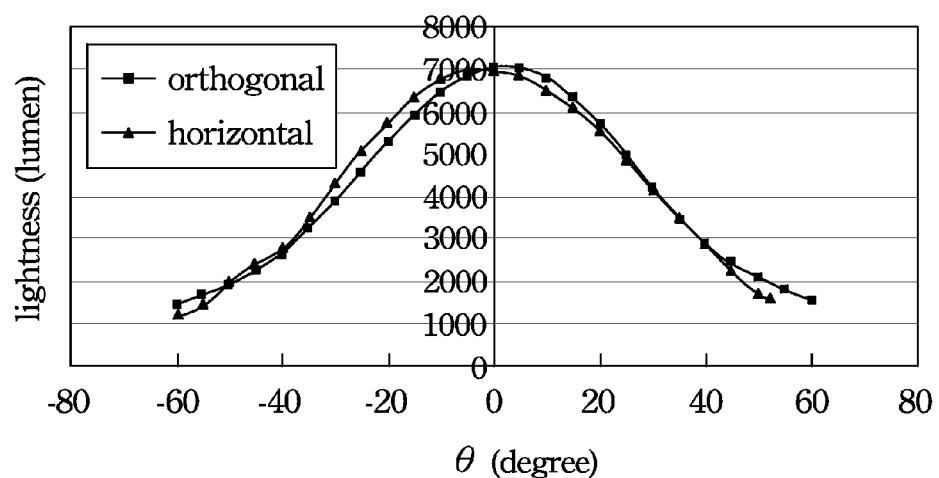
FIG. 10b and FIG. 10c are diagrams shoeing the light distributions of typical backlight modules.
Figure 10C:
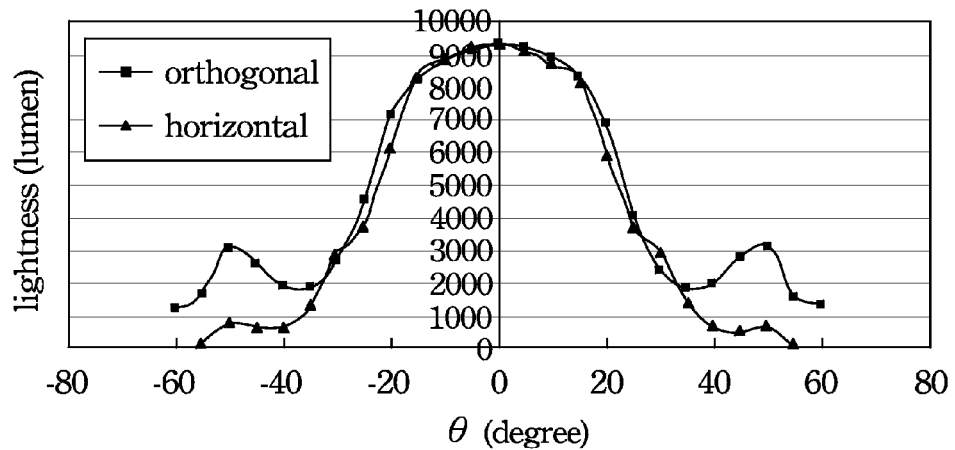

The light distributions of the typical (conventional) backlight modules are shown as FIG. 10b and FIG. 10c. FIG. 10b corresponds to one of the typical (conventional) backlight modules including a brightness enhancement film used to centralize light corresponding to top and bottom viewing angles, and FIG. 10c corresponds to another one of the typical (conventional) backlight modules including two brightness enhancement films used to centralize light corresponding to right and left viewing angles and the light corresponding to the top and bottom viewing angles. It can be known from FIG. 10b and FIG. 10c, the collimation of the backlight module with two films is greater than that of the backlight module with one film, but the two typical (conventional) backlight modules have certain amount of light corresponding to large viewing angles.

Figure 11A:
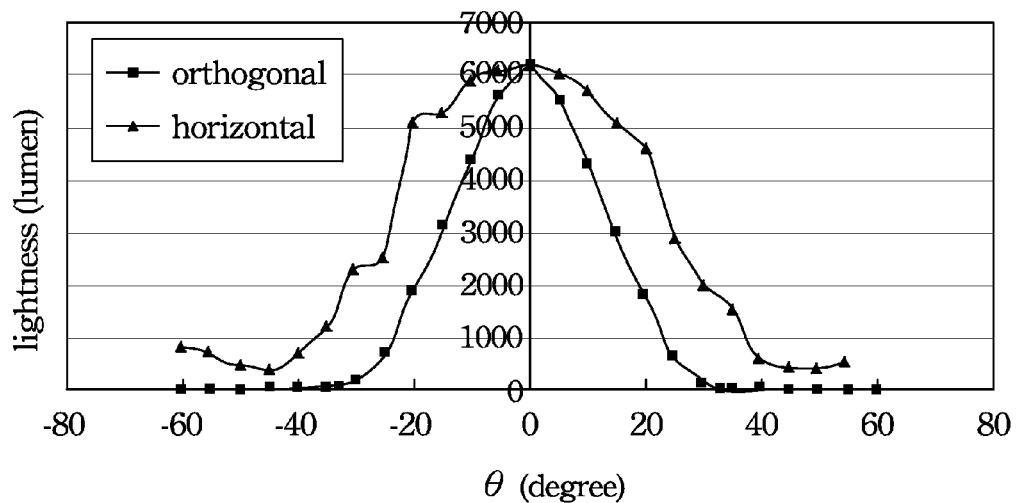
FIG. 11a is a diagram showing the intensity of the light corresponding to variable viewing angles of the backlight modules in accordance with an embodiment of the present invention.

Referring to FIG. 11a, FIG. 11a is a diagram showing the intensity of the light corresponding to variable viewing angles of the backlight modules 614, wherein a normal viewing angle corresponds 0 degrees, and a right viewing angle and a left viewing angle respectively correspond to 90 degrees and −90 degrees. It can be known from the above embodiments that the grating period is from 0.15 um to 1.3 um. It is assumed that when the diffractive optic element 620 has a grating period of 1.3 um (a boundary of the range of the grating period), the light of the first order diffraction corresponding to a normal viewing angle is able to compensate the image corresponding to a side viewing angle of 25 degrees, and the light of the second order diffraction corresponding to the normal viewing angle is able to compensate the image corresponding to a side viewing angle of 58 degrees. However, the light corresponding to a side viewing angle of at least 25 or 58 degrees may be diffracted to the normal viewing angle and thereby degrading the image quality corresponding to the normal viewing angle. Therefore, the image quality corresponding to the normal viewing angle can be improved by only providing backlights of at most 25 degrees (0-25 degrees) to the liquid crystal panel 612. However, when backlights of at most 58 degrees (0-58 degrees) are provided to the liquid crystal panel 612, the image quality corresponding to the normal viewing angle is not as good as that described above, but has a little improvement, because light diffracted to the normal viewing angle range (includes variable normal viewing angles) through the second order diffraction does not occur.

In this embodiment, the backlight module 614 only provides light at most 25 degrees (0-25 degrees) to liquid crystal panel 612 (in this embodiment, collimation light sources corresponding to a normal direction are provided, and collimation light sources corresponding to a horizontal direction are not provided), so that the light corresponding to a side viewing angle of at least 25 degrees and diffracted to the normal viewing angle almost do not exist. It is noted that in the FIG. 11a, it can be find that the light emitted by the backlight module may have a little component corresponding to at least 25 degrees, but the little component has almost no influence on the image quality corresponding to the normal viewing angle. Comparing to the typical (conventional) light distributions, the light distributions of the backlight module 614 can greatly improve the image quality. It means that for the angles in which light is not desirable, when the light intensity is lower than original, the image quality can be improved accordingly.

It is noted that in this embodiment, a light-blocking (or shielding) device, such as a barrier film, is disposed on the backlight module 614 to block the light emitted to normal viewing angles (or side viewing angles), thereby enabling a light emitting angle of the backlight module to meet the requirements defined in the above description. However, in the other embodiments of the present invention, the backlight module can be made in other ways for meeting the requirements. For example, light transferring devices, such as light reflectors, are disposed on the backlight module, thereby transferring light to a desired angle range for light emitting.

Figure 11B:
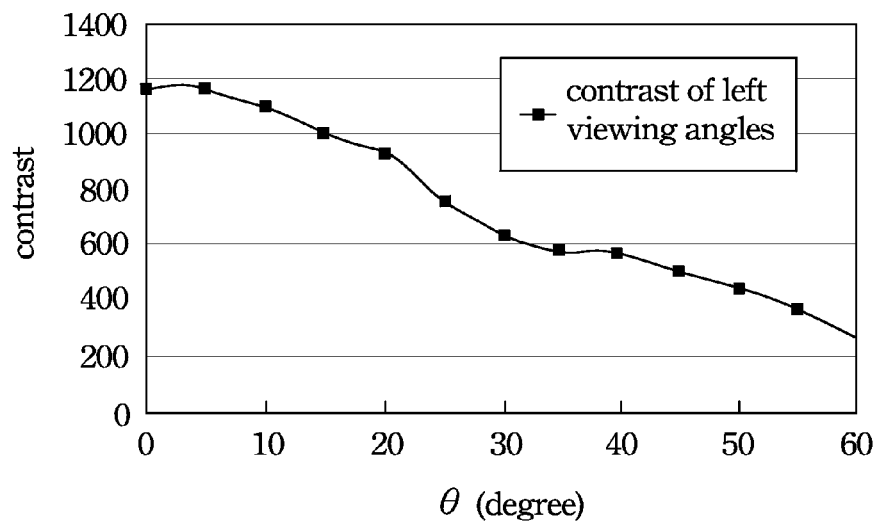
FIG. 11b is a curve diagram showing the relation between left (right) viewing angles and contrast corresponding to the display device in accordance with an embodiment of the present invention.

Referring to FIG. 11b, FIG. 11b is a curve diagram showing the relation between left (right) viewing angles and contrast corresponding to the display device 600. It can be known from FIG. 11b that the contrast corresponding to the normal viewing angle of the display device 600 is about 1150, and the half-height width thereof is about 40 to 50 degrees. Therefore, the contrast and the visual angle of the display device 600 are greatly improved comparing to the display device 100, even though the light of the backlight module 614 is not entirely collimated. The above conclusion can be obtained from the comparison between FIG. 4b and FIG. 11b.

It is noted that the above descriptions merely provides an outline of the requirements about how to use the light source slightly collimated to improve the image quality. For the normal viewing angles, in the case of the fixed grating period, when a first order diffraction angle and a second order diffraction angle corresponding to the fixed grating period are respectively equal to κ and ξ, an image corresponding to a side viewing angle (diagonal viewing angle) of κ degrees is not diffracted to the normal viewing angles, but an image corresponding to a side viewing angle (diagonal viewing angle) of a value greater than κ degrees is diffracted to the normal viewing angles. Similarly, an image corresponding to a side viewing angle (diagonal viewing angle) of ξ degrees is not diffracted to the normal viewing angles actually, but an image corresponding to a side viewing angle (diagonal viewing angle) of a value greater than ξ degrees is diffracted to the normal viewing angles. As described above, the image quality corresponding to the normal viewing angles can be improved as long as the collimated light at most κ(ξ) degrees.

It can be known from the above descriptions, when the image quality corresponding to the normal viewing angles are affected by light diffracted from a side viewing angle of a certain value, the backlight module provides the light corresponding to an angle of at most the certain value to the panel, thereby reducing the degradation of the image quality corresponding to the normal viewing angles. In other words, for the light corresponding to a main viewing angle range, when light provided by the backlight module corresponds to the main viewing angle range (0±10 degrees) and have variable diffraction angles of multiple orders (for example, a first order diffraction angle, a second order diffraction angle, a third diffraction angle, etc), the backlight module does not provide the light of at least $N^{th}$ order diffraction, wherein N is a positive number. However, for the light corresponding to other viewing angle ranges, the back light module does not provide the light diffracted to the normal viewing angles through $N^{th}$ order diffraction.

In general, the diffraction efficiency of the first order diffraction and the second order diffraction is greatly higher than that of other order diffraction. It is assumed that when the grating period of the diffractive optic element is greater than 0.9 um, there is light corresponding to a certain side viewing angle, and the light can be diffracted to the normal viewing angle through second order diffraction and have influence on the image quality; when the grating period of the diffractive optic element is greater than 0.45 um, light corresponding to a certain side viewing angles diffracted to the normal viewing angle through first order diffraction and have influence on the image quality of the normal viewing angle. Therefore, when the light of first order diffraction and second diffraction order corresponding to a certain side viewing angle affects the image quality corresponding to the normal viewing angles, if the backlight module merely provides light corresponding an angle smaller than a first order diffraction angle to the panel, the image quality corresponding to the normal viewing angle range can be greatly improved, or if the backlight module provides fewer light corresponding to an angle equal to at least the first order diffraction angle to the panel, the image quality corresponding to the normal viewing angle range can be greatly improved. The backlight module provides fewer or no light corresponding to an angle range (first order diffraction angle range or second diffraction angle range) to the panel, the image quality corresponding to the normal viewing angle range can be greatly improved, wherein the angle range is determined by a main viewing angle range. For example, in this embodiment, the main viewing angle range is 0±10 degrees, so that the angle range is equal to the value of the first order diffraction angle minus/plus 10 degrees. In addition, in the other embodiments of the present invention, angles corresponding to the blacking light diffracted to the main viewing angles are calculated, and the backlights corresponding to the angles are decreased or removed for improving the image quality. Further, when the influence of the first order diffraction is considered for the design of the backlight module, the image quality corresponding to the normal viewing angles is preferable.

It is noted that in the above cases, the design of the light distributions of the backlight module is for the purpose of improving the image quality corresponding to the normal viewing angle (θ=0 degrees). When other viewing angles (for example, in some displays, the image quality corresponding a viewing angle other than the normal viewing angle is optimized) are considered for the design of the light distributions, the backlight module can be optimized by the analogy as the cases mentioned above, so as to improve the image quality corresponding to the main viewing angles. Further, when the image quality of images corresponding to a main angle range (for example, angle range of θ=0±10 degrees) is desired to be improved, the light diffracted to the main viewing angle range though light diffraction (particularly the first order diffraction or the second order diffraction) is removed or decreased (decrease brightness), thereby enhancing the image quality corresponding to the main viewing angle range.

In addition, it is noted that because the present backlight module usually provides uniform light for variable viewing angles, the barrier film can be used to limit light emitting angles of the backlight module, thereby enabling the present backlight module to only provide a light corresponding to an angle less than a certain value. In addition, of the backlight module can be used to reflect the light corresponding to other angles (not required to emit light) to the angles desired, thereby increasing the efficiency of the backlight module.

Seventh Embodiment

Figure 12A:
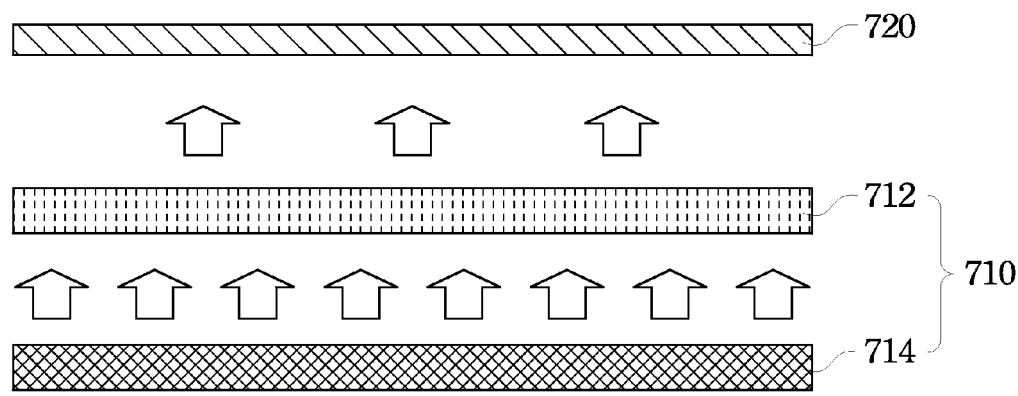
FIG. 12a is a diagram showing the structure of a display device in accordance with an embodiment of the present invention.

Referring to FIG. 12a, FIG. 12a is a diagram showing the structure of a display device 700 in accordance with an embodiment of the present invention. The display device 200 includes a display 710 and a diffractive optic element 720. The display 710 is a TN LCD and includes a liquid crystal panel 712 and a backlight module 714. The display device 700 is similar to the display device 600, but the difference is in that a direction of a diffraction grating disposed on a diffractive optical element 720 is different from that of the diffraction grating disposed on the diffractive optical element 620. In this embodiment, the main direction of the diffraction grating of the diffractive optical element 220 is 0 degrees (or 180 degrees), thereby compensating images corresponding to bottom viewing angles of the display 710.

It can be known from the sixth embodiment that the contrast corresponding to the main viewing angle can be increased by limiting the light emitting directions of the backlight module or by decreasing the brightness of light of the backlight module corresponding to a certain viewing angle (the light of the backlight module can be diffracted to affect the image quality corresponding to the main viewing angle). Similarly, the contrast corresponding to top viewing angles and bottom viewing angles can be improved by using the method described above. In addition, the brightness corresponding to a large angle of the bottom viewing angles is significantly lower in middle gray levels comparing those in other gray levels. It means that the utilization rate of the light is not high. This can be known from FIG. 6a. Therefore, transferring the light corresponding to the large angle of the bottom viewing angles to other viewing angles (for example, the normal viewing angle) not only increases the image quality of the display device 700 but saves energy.

Figure 12B:
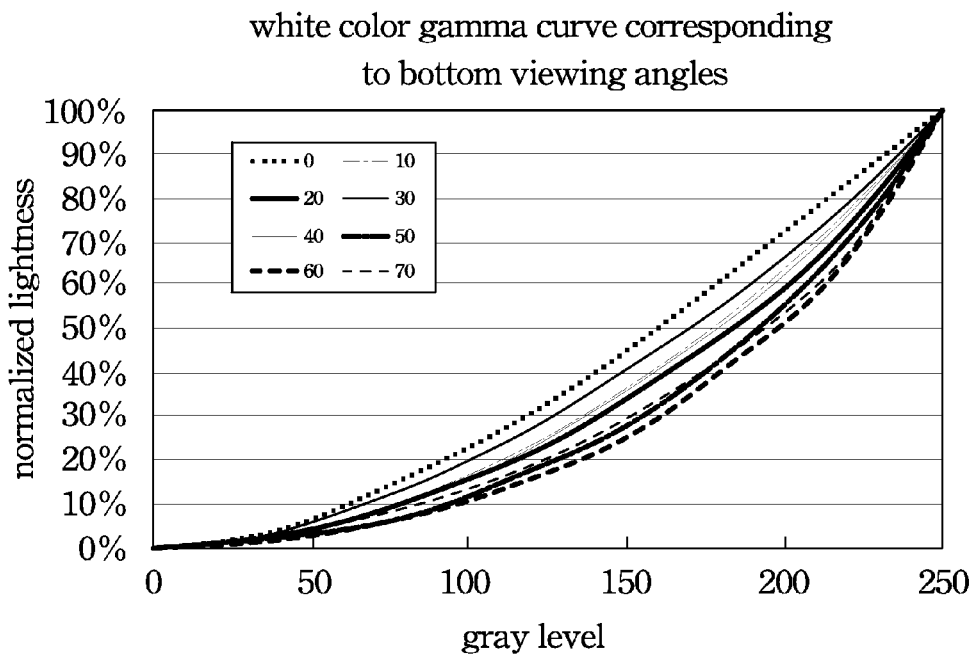
FIG. 12b is a diagram showing that the gamma curves corresponding to the bottom viewing angles of the display device with an embodiment of the present invention in accordance with an embodiment of the present invention.
Figure 12C:
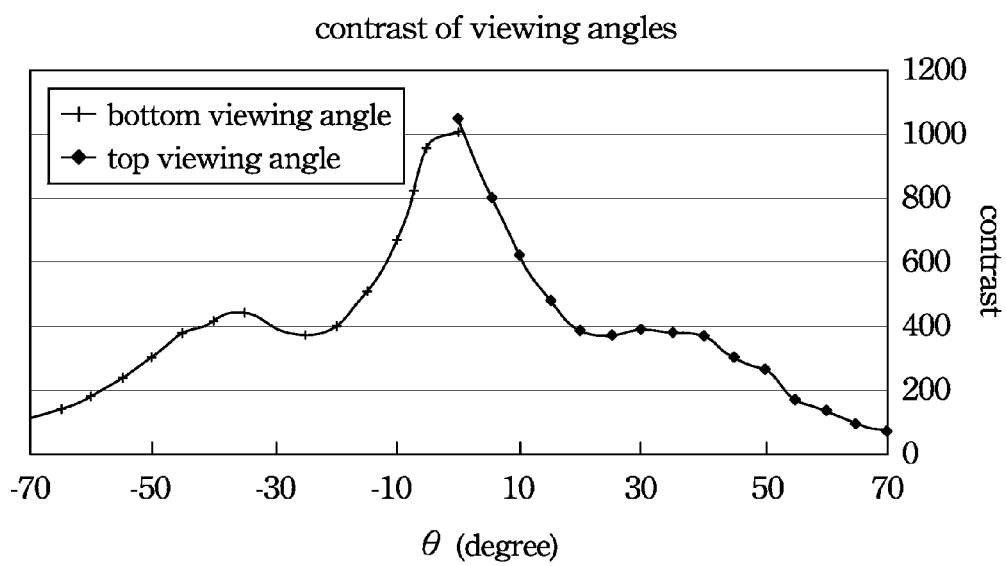
FIG. 12c is a diagram showing that the contrast curve corresponding to the top and bottom viewing angles of the display device in accordance with an embodiment of the present invention.
Figure 12D:
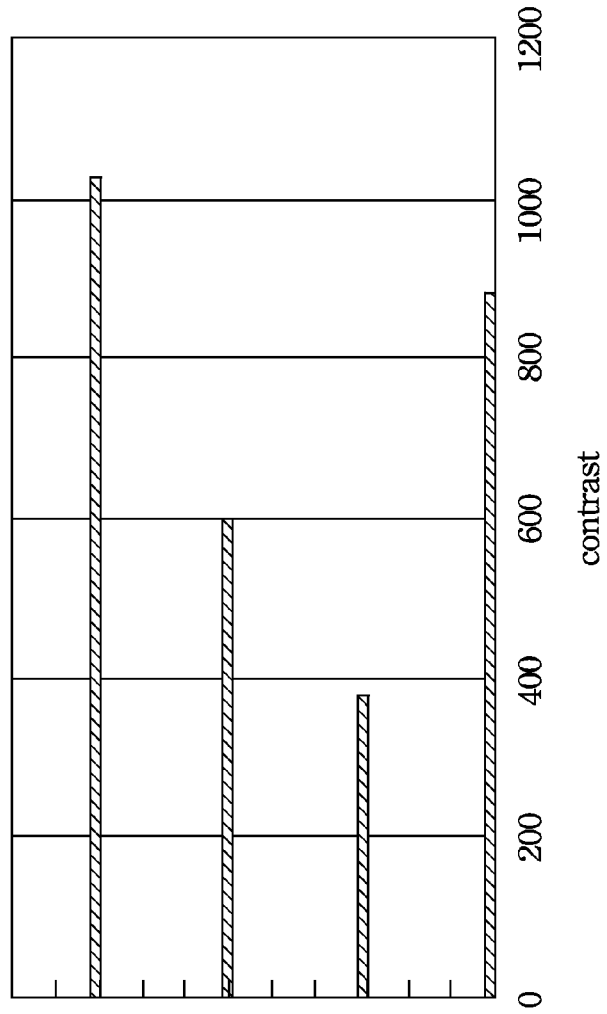
FIG. 12d is a diagram showing the contrast of variable display devices.

Referring to FIG. 12b to FIG. 12d, FIG. 12b is a diagram showing that the gamma curves corresponding to the bottom viewing angles of the display device 700; FIG. 12c is a diagram showing that the contrast curve corresponding to the top and bottom viewing angles of the display device 700; FIG. 12d is a diagram showing the contrast of variable display devices. It can be known from FIG. 12b to FIG. 12d that the display device 700 does not have gray level inversion and the gamma curves corresponding to the normal viewing angles and the diagonal viewing angles are close to each other. Comparing to the image quality of the display device 200, the image quality of the display device 700 is more superior, and the central contrast of the display device 700 is significantly increased, and the half-height width of display device 700 is widen to ±40 degrees.

Figure 12E:
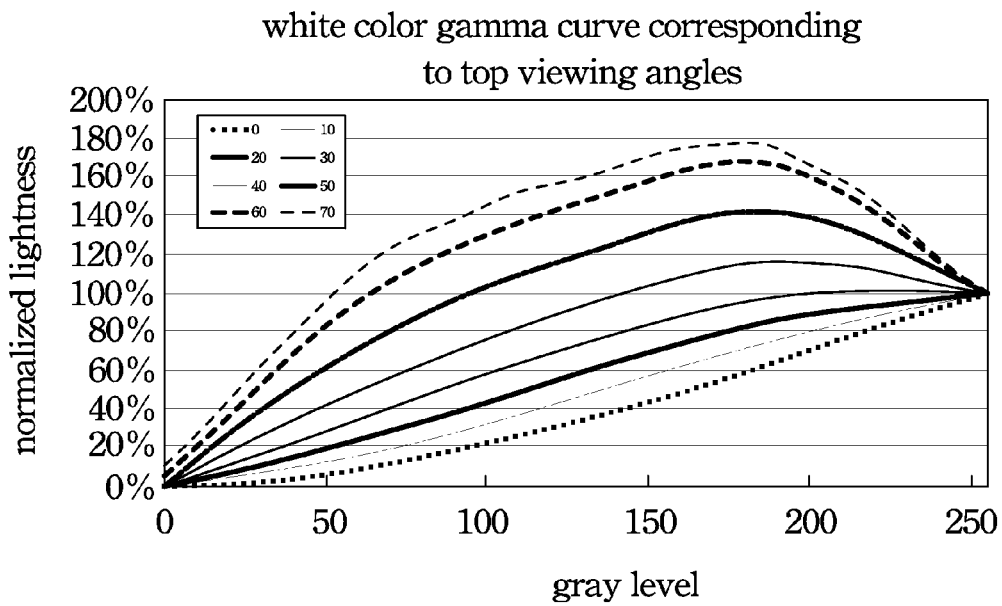
FIG. 12e is a diagram showing the gamma curves corresponding to the top viewing angles of a typical TN display on which a typical compensation film is added.
Figure 12F:
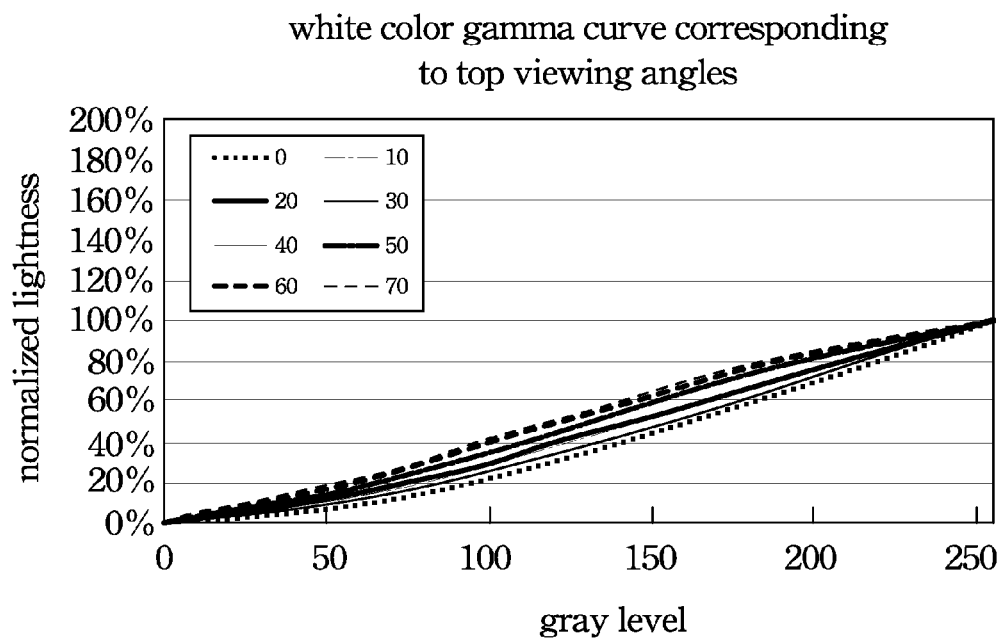
FIG. 12f is a diagram showing the gamma curves corresponding to the top viewing angles of the display device in accordance with an embodiment of the present invention.

Thereafter, the image quality corresponding to the top viewing angles of the display device 700 is considered. Referring to FIG. 12e and FIG. 12f, FIG. 12e is a diagram showing the gamma curves corresponding to the top viewing angles of a typical (conventional) TN display on which a typical (conventional) compensation film is disposed; FIG. 12f is a diagram showing the gamma curves corresponding to the top viewing angles of the display device 700. As known FIG. 12e, in addition to the above problems regarding contrast and gray level inversion, deviation of gamma curve caused by the high brightness transmittance corresponding to a large viewing angle in a middle gray level is also serious. It means that when the diffractive optic element is disposed on the display device, it is not required to have high brightness in the directions, and thus the light of the backlight modules corresponding to the directions can be removed or the brightness thereof can be decreased for improving the image quality. In addition, when the light of the backlight modules corresponding the directions are transferred to other viewing angles corresponding to good image quality (i.e., normal viewing angle), the effects of power saving and brightness increasing can be achieved. As shown in FIG. 12, the gamma curves of the display device 700 are very close to each other.

Figure 12G:
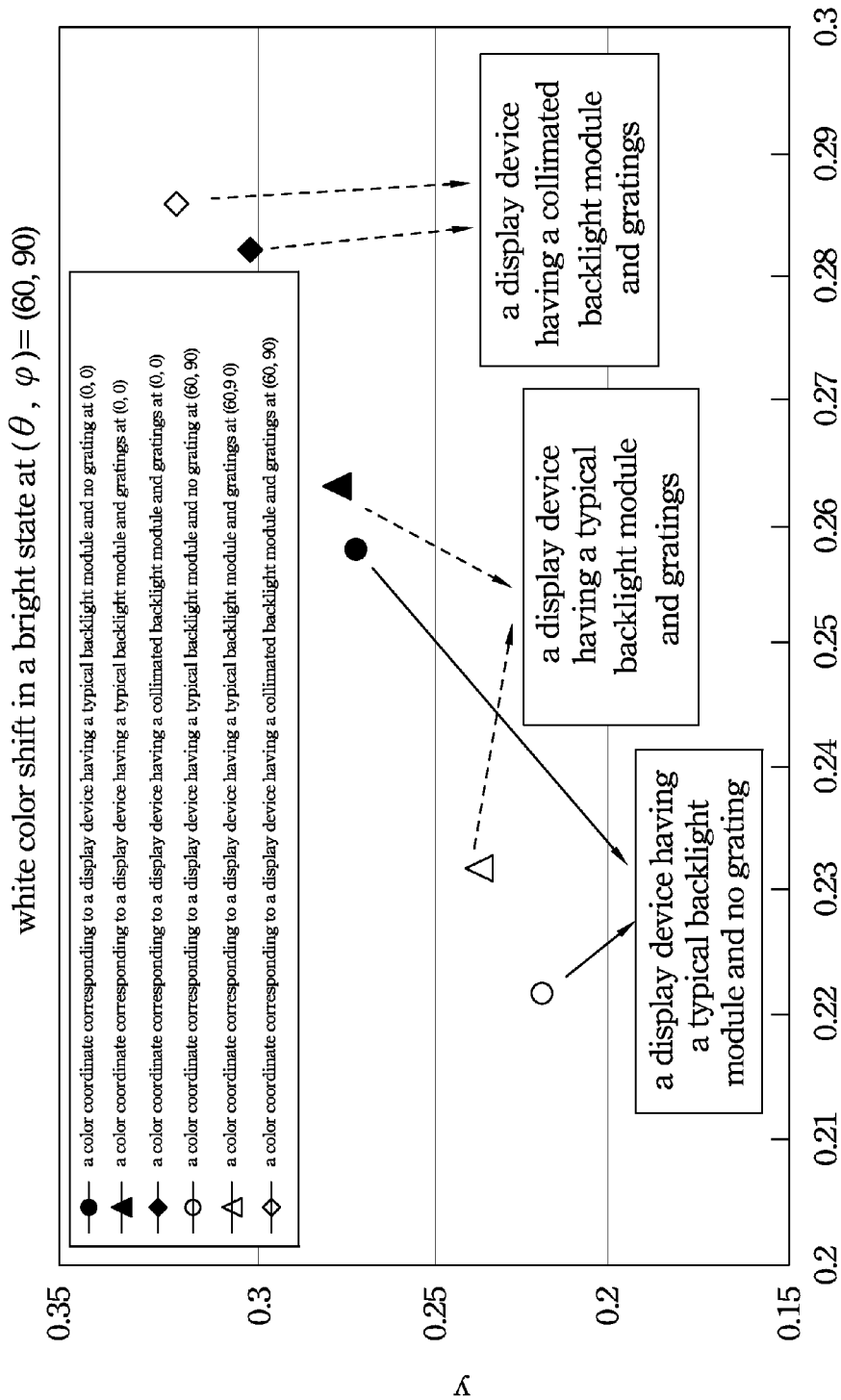
FIG. 12g is a diagram showing the situation of white color shift in a bright stat of images of variable display devices corresponding to a top viewing angle of 60 degrees.

Referring to FIG. 12g, FIG. 12g is a diagram showing the situation of white color shift in a bright state of images of variable display devices corresponding to a top viewing angle of 60 degrees. It can be known form FIG. 12g, the greater the light of the backlight module of the display device are collimated, the less the color shift situation. It means that the chroma points corresponding to the normal viewing angles and the side viewing angle are closer.

Eighth Embodiment

Figure 13:
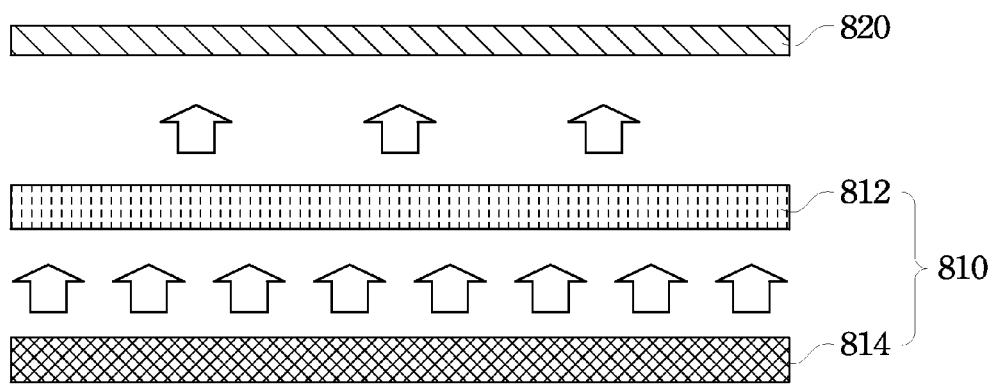
FIG. 13 is a diagram showing the structure of a display device 800 in accordance with an embodiment of the present invention.

Referring to FIG. 13, FIG. 13 is a diagram showing the structure of a display device 800 in accordance with an embodiment of the present invention. The display device 800 includes a display 810 and a diffractive optic element 820. The display 810 is a TN LCD and includes a liquid crystal panel 812 and a backlight module 814. The display device 800 is similar to the display device 600, i.e., the backlight module 814 of the display 810 also provides light which is slightly collimated, but the difference there between is in that the brightness of the light is determined by the relation between the brightness corresponding to main viewing angles and secondary viewing angles. When the brightness corresponding to a $1^{st}$ viewing angle, a $2^{nd}$ viewing angle, a $3^{rd}$ viewing angle, . . . , a $n^{th}$ viewing angle is considered, wherein the effects caused by the diffraction of the light corresponding to entire viewing angles can also be considered. It is assumed that for the $1^{st}$ viewing angle (main viewing angle), the brightness of the backlights is $B_1$; a transmittance of the liquid crystal module is $T_1$%; the brightness of the display 810 is $W_1$ (the diffractive optic element 820 is not disposed thereon yet); the brightness of the display device 800 is $L_1$ (the diffractive optic element 820 is already disposed on the display 810); a total diffraction efficiency of the light diffracted to the variable viewing angles by the gratings of the diffractive optic element 820 is $D_{i\text{-}total}$ %; diffraction efficiency of the light diffracted from the $n^{th}$ viewing angle to the $1^{st}$ viewing angle is $D_{n-1}$ %. Further, it is assumed that for the $2^{nd}$ viewing angle (secondary viewing angle), the brightness of the backlights is $B_2$; a transmittance of the liquid crystal module is $T_2$ %; the brightness of the display 810 is $W_2$ (the diffractive optic element 820 is not disposed thereon yet); the brightness of the display device 800 is $L_2$ (the diffractive optic element 820 is disposed on the display 810); a total diffraction efficiency of the light diffracted to the variable viewing angles by the gratings of the diffractive optic element 820 is $D_{2\text{-}total}$ %; diffraction efficiency of the light diffracted from the $n^{th}$ viewing angle to the $2^{nd}$ viewing angle is $D_{n-2}$ %. The brightness corresponding to the $n^{th}$ viewing angle of the display 810 is $W_n$ (wherein the diffractive optic element 820 is not disposed thereon yet), and the brightness corresponding to the $n^{th}$ viewing angle of the display device 800 (wherein the diffractive optic element 820 is already disposed on the display device 800) can be represented in formulas listed below:

$$L_1 = W_1 * (1 - D_{1\text{-}total}\%) + \sum_{n=1,2,3...} W_n * D_{n-1}\% = [A] + [B] \quad (i)$$

$$L_2 = W_2 * (1 - D_{2\text{-}total}\%) + \sum_{n=1,2,3...} W_n * D_{n-2}\% = [C] + [D] \quad (ii)$$

$$W_1 = B_1 * T_1\%, [A] = W_1 * (1 - D_{1\text{-}total}\%), [B] = \sum_{n=1,2,3...} W_n * D_{n-1}\%$$

$$W_2 = B_2 * T_2\%, [C] = W_2 * (1 - D_{2\text{-}total}\%), [D] = \sum_{n=1,2,3...} W_n * D_{n-2}\%$$

(1) For example, it is assumed that the normal viewing angle is considered as a main viewing angle. When the brightness corresponding to a certain side viewing angle (secondary viewing angle) is less than three-tenths of the brightness corresponding to the normal viewing angle ($W_2 < 0.3 * W_1$), there is a chance that a light component of a viewing angle (other than the normal viewing angle and the secondary viewing angle) diffracted to the side viewing angle is greater than the brightness corresponding to the secondary viewing angle. Accordingly, the backlight module can be designed to lower the brightness of the light corresponding to the side viewing angle, or to transfer (or remove) the light corresponding to the side viewing angle to the normal viewing angle. (2) For another example, it is assumed that the normal viewing angle is considered as a main viewing angle. When the brightness corresponding to a certain side viewing angle (secondary viewing angle) is greater than 1.1 times of the brightness corresponding to the normal viewing angle ($W_2>1.1*W_1$), the brightness corresponding to the normal viewing angle may have insufficient diffraction contribution to the image corresponding to the side viewing angle. Accordingly, the backlight module can be designed to lower the brightness of the light corresponding to the side viewing angle, or to transfer (or remove) the light corresponding to the side viewing angle to the normal viewing angle. (3) For further another example, it is assumed that the normal viewing angle is considered as a main viewing angle. When a liquid crystal transmittance corresponding to a certain side viewing angle (secondary viewing angle) is less than seven-tenth of that corresponding to the normal viewing angle ($T_2<0.7*T_1$), the efficiency of the backlight corresponding to the side viewing angle is considered to be bad. Accordingly, the backlight module can be designed to lower the brightness of the light corresponding to the side viewing angle, or to transfer (or remove) the light corresponding to the side viewing angle to the normal viewing angle. (4) For further another example, it is assumed that the normal viewing angle is considered as a main viewing angle. When a liquid crystal transmittance corresponding to a certain side viewing angle (secondary viewing angle) is greater than 1.1times of that corresponding to the normal viewing angle ($T_2>1.1*T_1$), the brightness corresponding to the normal viewing angle may have insufficient diffraction contribution to the image corresponding top the side viewing angle. Accordingly, the backlight module can be designed to lower the brightness of the light corresponding to the side viewing angle, or to transfer (or remove) the light corresponding to the side viewing angle to the normal viewing angle. (5) The examples (1)-(4) are not limited to the main viewing angle which is equal to the normal viewing angle. The main viewing angle can be an originally optimized viewing angle for a display device. (6) Referring to formula (i), when 0.31[A]<[B], a component of the light corresponding to viewing angles other than the main viewing angle can be diffracted to the main viewing angle and the component of the light is sufficient to degrade the image quality corresponding to the normal viewing angle. Especially in the situation that the image quality corresponding to other viewing angles is bad, the image quality corresponding to the normal viewing angle would be degraded. At that time, a backlight module able to provide collimation light for the main viewing angle is very important. Accordingly, the backlight module can be designed to lower the brightness of the light corresponding to the side viewing angle, or to transfer (or remove) the light corresponding to the side viewing angle to the normal viewing angle. (7) Referring to formula (ii), when [C]>2*[D], the light corresponding viewing angles (particularly, the main viewing angle or a viewing angle corresponding to good image quality) has little diffraction contribution to the image corresponding to the secondary viewing angle, so that the improvement for the image quality corresponding to the secondary viewing angle is little. For improving the image quality corresponding to the secondary viewing angle, the backlight module can be designed to lower the brightness of the light corresponding to the side viewing angle, or to transfer (or remove) the light corresponding to the side viewing angle to the normal viewing angle. Examples (1) to (7) are not limited to a particular gray level. It just depends on the gray level desired to be improved. (9) Backlight modules meeting the above requirements are able to use backlight structures to decrease the backlight brightness to zero, or maintain a portion of backlight brightness in reference to the formulas (i) and (ii). It is noted that the light transferring device described in the above embodiment is not limited to only transfer light corresponding to the secondary viewing angle to the main viewing angle. The light transferring device can transfer the light corresponding to the secondary viewing angle to any other viewing angle, and the image quality can be improved as well, accordingly.

It can be known from the above descriptions that the display device 700 of this embodiment use the light transferring device to transfer light from a viewing angle corresponding to a smaller utilization rate to another viewing angle corresponding to a higher utilization rate, thereby achieving the target of power saving.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
a display comprising a light output surface and a liquid crystal layer comprising a plurality of liquid crystal molecules; and
a diffractive optical element disposed on the light output surface of the display, wherein the diffractive optical element comprises at least one diffraction grating, and a direction of the diffraction grating is defined by a connected line of crests or troughs of the diffraction grating;
wherein an angle between the direction of the diffraction grating and a bisector of a twist angle of the liquid crystal molecules of the liquid crystal layer is from 45 degrees to 135 degrees.

2. The display device of claim 1, wherein the display is a twisted nematic (TN) liquid crystal display or a super twisted nematic (STN) liquid crystal display.

3. The display device of claim 2, wherein the display comprises an upper polarizer and a lower polarizer, and the upper polarizer and the lower polarizer have a polarization direction of 45 degrees with respect to an x-axis of the display and a polarization directions of 135 degrees with respect to the x-axis of the display, respectively, and an x-y plane including the x-axis is defined on the diffractive optical element, and a positive direction of the x-axis is defined by a right viewing angle of the display and a negative direction of the x-axis is defined by a left viewing angle of the display.

4. The display device of claim 2, wherein the display comprises an upper polarizer and a lower polarizer, and the upper polarizer and the lower polarizer have a polarization direction of 0 degrees with respect to an x-axis of the display and a polarization directions of 90 degrees with respect to the x-axis of the display, respectively, and an x-y plane including the x-axis is defined on the diffractive optical element, and a positive direction of the x-axis is defined by a right viewing angle of the display and a negative direction of the x-axis is defined by a left viewing angle of the display.

5. The display device of claim 2, wherein a top layer liquid crystal molecules is the liquid molecules closest to the light output surface of the display, a bottom layer liquid crystal molecules is the liquid molecules farthest to the light output surface of the display, wherein the twist angle of the liquid crystal molecules of the liquid crystal layer is defined from a head terminal of the bottom layer liquid crystal molecules to a end terminal of the top layer liquid crystal molecules.

6. The display device of claim 1, wherein the angle between the direction of the diffraction grating and the bisector of the twist angle of the liquid crystal molecules of the liquid crystal layer is 90 degrees.

7. The display device of claim 2, wherein the display comprises:
a backlight module;
a lower polarizer, disposed on the backlight module ;
a liquid crystal layer, disposed on the lower polarizer; and
an upper polarizer, disposed on the liquid crystal layer and having a polarization layer;
wherein the diffractive optical element is disposed on the polarization layer of the upper polarizer, and a light is emitted from the backlight module toward the lower polarizer.

8. The display device of claim 1, wherein a grating period of the diffraction grating is from 0.16 micrometer to 1.3 micrometer.

9. The display device of claim 1, wherein a grating period of the diffraction grating is from 0.26 micrometer to 0.78 micrometer.

10. The display device of claim 1, wherein a grating period of the diffraction grating is from 0.29 micrometer to 1.33 micrometer.

11. The display device of claim 1, wherein the diffraction grating has a plurality of grating directions or has a plurality of grating periods.

12. The display device of claim 1, wherein at least two grating directions of the diffraction grating are perpendicular with each other.

13. The display device of claim 1, wherein a diffraction effect of the diffraction grating is symmetric.

14. The display device of claim 1, wherein the diffraction grating is a phase grating.

15. A display device, comprising:
a display comprising a light output surface and a liquid crystal layer; and
a diffractive optical element disposed on the light output surface of the display, wherein the diffractive optical element comprises at least one diffraction grating with a grating period from 0.16 micrometer to 1.3 micrometer;
wherein the diffraction grating has a first grating direction and an angle between the first grating direction and a bisector of a twist angle of the liquid crystal molecules of the liquid crystal layer is from 45 degrees to 135 degrees, and wherein the first grating direction of the diffraction grating is defined by a connected line of crests or troughs of the diffraction grating.

16. The display device of claim 15, wherein the diffraction grating further has a second grating direction substantially perpendicular to the first grating direction, and the second grating direction of the diffraction grating is defined by another connected line of crests or troughs of the diffraction grating.

17. The display device of claim 15, further comprises:
an upper polarizer, disposed on a first side of the liquid crystal layer;
a lower polarizer, disposed on a second side of the liquid crystal layer, wherein the second side is opposite to the first side;
a backlight module, used to provide a light for the display device, wherein the backlight module has a first brightness in a first light emitting angle and a second brightness in a second light emitting angle; and
a light transferring device, disposed between the backlight module and the lower polarizer, wherein the light transferring device is used to transfer light corresponding to the second light emitting angle to decrease the second brightness, and the decreased second brightness is smaller than the first brightness.

18. The display device of claim 15, wherein a twist angle of the liquid crystal molecules of the liquid crystal layer is defined from the a rubbing direction of the second side of the liquid crystal layer to an opposite rubbing direction of the first side of the liquid crystal layer.

* * * * *